United States Patent
Lekivetz et al.

(10) Patent No.: US 11,087,033 B1
(45) Date of Patent: Aug. 10, 2021

(54) TOOL FOR DESIGN EXPERIMENTS WITH UNCONTROLLED FACTORS

(71) Applicant: SAS Institute Inc., Cary, NC (US)

(72) Inventors: Ryan Adam Lekivetz, Cary, NC (US); Bradley Allen Jones, Cary, NC (US); Joseph Albert Morgan, Raleigh, NC (US); Caleb Bridges King, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/153,731

(22) Filed: Jan. 20, 2021

Related U.S. Application Data

(60) Provisional application No. 63/040,901, filed on Jun. 18, 2020.

(51) Int. Cl.
*G06F 30/12* (2020.01)
*G06F 17/18* (2006.01)
*G06F 30/27* (2020.01)
*G06F 111/20* (2020.01)

(52) U.S. Cl.
CPC .............. *G06F 30/12* (2020.01); *G06F 17/18* (2013.01); *G06F 30/27* (2020.01); *G06F 2111/20* (2020.01)

(58) Field of Classification Search
CPC .......... G06F 30/12; G06F 30/37; G06F 17/18; G06F 2111/20; G06F 111/20
See application file for complete search history.

(56) References Cited

U.S. PATENT DOCUMENTS

| 10,296,680 | B2 * | 5/2019 | Morgan | G06F 30/20 |
| 10,318,674 | B2 * | 6/2019 | Morgan | G06F 30/20 |
| 10,902,162 | B2 * | 1/2021 | Morgan | G06F 30/20 |
| 2005/0261953 | A1 * | 11/2005 | Malek | G06Q 30/0201 705/7.32 |

(Continued)

OTHER PUBLICATIONS

Miller, Alan J., et al., "Algorithm AS 295: A Fedorov Exchange Algorithm for D-Optimal Design", Journal of the Royal Statistical Society, Series C (Applied Statistics), vol. 43, No. 4, pp. 669-677 (1994).

(Continued)

*Primary Examiner* — Vuthe Siek
(74) *Attorney, Agent, or Firm* — Coats + Bennett, PLLC

(57) ABSTRACT

A computing system generates a subset of design cases of candidate design cases. The system indexes, in the subset, data elements. The system generates a design of an experiment by, for each respective data element, determining a status indicating whether the respective data element corresponds to an uncontrolled factor or a controlled factor. When the status indicates the uncontrolled factor, the system determines if substituting a respective set of specified options of a respective candidate design case comprising the respective data element with a different set of specified options of the candidate design cases improves a criterion measure according to a design criterion. When the status indicates the controlled factor, the system determines if changing an assigned option of the respective data element improves the criterion measure. The system updates the criterion measure with an updated criterion measure according to a change of the subset based on generating the design.

30 Claims, 27 Drawing Sheets

(56) References Cited

U.S. PATENT DOCUMENTS

| | | | | |
|---|---|---|---|---|
| 2009/0228846 | A1* | 9/2009 | McConaghy | G06F 30/36 |
| | | | | 716/106 |
| 2018/0060466 | A1* | 3/2018 | Morgan | G06F 30/20 |
| 2018/0060468 | A1* | 3/2018 | Morgan | G06F 30/20 |
| 2018/0060469 | A1* | 3/2018 | Morgan | G06F 30/20 |
| 2020/0117580 | A1* | 4/2020 | Lekivetz | G06F 11/3684 |

OTHER PUBLICATIONS

Atkinson, Anthony, et al., "Optimum Experimental Designs, With SAS", Manchester Institute for Mathematical Sciences, School of Mathematics, The University of Manchester, ISSN 1749-9097 (2007).

Cheng, Ching-Shui, et al., "E(s2)- and UE(s2)—Optimal Supersaturated Designs", Journal of Statistical Planning and Interference (Nov. 2017).

Jones, Bradley, et al., "Bayesian D-optimal supersaturated designs", Journal of Statistical Planning and Interference, vol. 138, pp. 86-92 (2008).

Meyer, Ruth K., et al., "The Coordinate-Exchange Algorithm for Constructing Exact Optimal Experimental Designs", Technometrics, vol. 37, No. 1, pp. 60-69 (Feb. 1995).

* cited by examiner

| Miles | Weight | Strike Point |
|---|---|---|
| 6.0 | 150 | Heel |
| 6.4 | 146 | Heel |
| 6.4 | 146 | Heel |
| 6.4 | 147 | Forefoot |
| 6.4 | 148 | Heel |
| 6.4 | 148 | Heel |
| 6.8 | 149 | Heel |
| 7.2 | 146 | Heel |
| 7.2 | 146 | Heel |
| 7.6 | 144 | Midfoot |
| 7.6 | 145 | Midfoot |
| 7.6 | 148 | Heel |
| 7.6 | 149 | Heel |
| 7.6 | 150 | Forefoot |
| 8.0 | 144 | Heel |
| 8.0 | 146 | Heel |
| 8.0 | 147 | Forefoot |
| 8.0 | 147 | Heel |
| 8.0 | 148 | Forefoot |
| 8.0 | 149 | Heel |
| 8.4 | 145 | Heel |
| 8.4 | 146 | Heel |
| 8.4 | 147 | Heel |
| 8.4 | 148 | Heel |
| 8.4 | 148 | Heel |
| 8.8 | 142 | Forefoot |
| 8.8 | 146 | Heel |
| 8.8 | 147 | Heel |
| 8.8 | 147 | Heel |
| 8.8 | 150 | Heel |
| 9.2 | 144 | Heel |
| 9.2 | 145 | Heel |
| 9.2 | 145 | Heel |
| 9.2 | 145 | Heel |
| 9.2 | 146 | Midfoot |
| 9.2 | 146 | Heel |
| 9.2 | 146 | Forefoot |
| 9.2 | 147 | Heel |
| 9.2 | 148 | Heel |
| 9.2 | 148 | Heel |
| 9.2 | 149 | Forefoot |
| 9.2 | 152 | Midfoot |
| 9.6 | 145 | Heel |
| 9.6 | 146 | Midfoot |
| 9.6 | 146 | Heel |
| 9.6 | 148 | Heel |
| 9.6 | 149 | Heel |
| 10.0 | 146 | Heel |
| 10.0 | 146 | Heel |
| 10.0 | 146 | Heel |

1600A

| Miles | Weight | Strike Point |
|---|---|---|
| 10.0 | 147 | Heel |
| 10.0 | 147 | Midfoot |
| 10.4 | 143 | Midfoot |
| 10.4 | 144 | Heel |
| 10.4 | 144 | Heel |
| 10.4 | 145 | Heel |
| 10.4 | 146 | Heel |
| 10.4 | 146 | Heel |
| 10.4 | 147 | Heel |
| 10.8 | 143 | Forefoot |
| 10.8 | 143 | Midfoot |
| 10.8 | 144 | Midfoot |
| 10.8 | 144 | Heel |
| 10.8 | 145 | Heel |
| 10.8 | 145 | Forefoot |
| 10.8 | 145 | Heel |
| 10.8 | 145 | Midfoot |
| 10.8 | 147 | Heel |
| 10.8 | 148 | Midfoot |
| 11.2 | 138 | Heel |
| 11.2 | 141 | Heel |
| 11.2 | 143 | Midfoot |
| 11.2 | 144 | Forefoot |
| 11.2 | 144 | Midfoot |
| 11.2 | 145 | Midfoot |
| 11.2 | 146 | Midfoot |
| 11.2 | 148 | Heel |
| 12.0 | 141 | Midfoot |
| 12.0 | 142 | Heel |
| 12.0 | 142 | Midfoot |
| 12.0 | 142 | Heel |
| 12.0 | 142 | Midfoot |
| 12.0 | 144 | Heel |
| 12.4 | 140 | Midfoot |
| 12.4 | 142 | Heel |
| 12.4 | 143 | Midfoot |
| 12.4 | 144 | Midfoot |
| 12.4 | 144 | Heel |
| 12.4 | 145 | Heel |
| 12.4 | 146 | Midfoot |
| 12.8 | 139 | Heel |
| 12.8 | 141 | Midfoot |
| 13.2 | 140 | Midfoot |
| 13.2 | 141 | Heel |
| 13.2 | 142 | Midfoot |
| 13.2 | 143 | Midfoot |
| 13.2 | 145 | Midfoot |
| 13.2 | 146 | Midfoot |
| 14.0 | 139 | Midfoot |
| 14.8 | 141 | Midfoot |

| Miles | Weight | Strike Point | Shoe Type |
|---|---|---|---|
| 6.0 | 150 | Heel | A |
| 6.4 | 146 | Heel | A |
| 6.4 | 146 | Heel | B |
| 6.4 | 147 | Forefoot | A |
| 6.4 | 148 | Heel | B |
| 7.6 | 144 | Midfoot | A |
| 7.6 | 145 | Midfoot | B |
| 7.6 | 150 | Forefoot | A |
| 8.8 | 142 | Forefoot | B |
| 8.8 | 150 | Heel | B |
| 9.2 | 149 | Forefoot | B |
| 9.2 | 152 | Midfoot | B |
| 10.8 | 143 | Forefoot | B |
| 10.8 | 148 | Midfoot | A |
| 11.2 | 138 | Heel | A |
| 11.2 | 144 | Forefoot | A |
| 11.2 | 148 | Heel | A |
| 12.4 | 140 | Midfoot | B |
| 12.4 | 145 | Heel | A |
| 12.8 | 139 | Heel | B |
| 13.2 | 141 | Heel | B |
| 13.2 | 146 | Midfoot | B |
| 14.0 | 139 | Midfoot | A |
| 14.8 | 141 | Midfoot | A |

| Miles | Weight | Strike Point | Shoe Type |
|---|---|---|---|
| 6.4 | 146 | Heel | B |
| 6.4 | 146 | Heel | A |
| 6.4 | 147 | Forefoot | A |
| 7.6 | 144 | Midfoot | B |
| 7.6 | 145 | Midfoot | A |
| 7.6 | 150 | Forefoot | B |
| 8.8 | 142 | Forefoot | B |
| 8.8 | 150 | Heel | A |
| 9.2 | 149 | Forefoot | B |
| 9.2 | 152 | Midfoot | B |
| 9.6 | 149 | Heel | B |
| 10.4 | 143 | Midfoot | A |
| 10.8 | 143 | Forefoot | B |
| 10.8 | 145 | Forefoot | A |
| 11.2 | 138 | Heel | A |
| 11.2 | 144 | Forefoot | A |
| 11.2 | 148 | Heel | A |
| 12.4 | 140 | Midfoot | B |
| 12.4 | 145 | Heel | B |
| 12.8 | 139 | Heel | B |
| 13.2 | 141 | Heel | A |
| 13.2 | 145 | Midfoot | A |
| 13.2 | 146 | Midfoot | A |
| 14.8 | 141 | Midfoot | B |

*FIG. 16D*

| | Miles | Weight | Strike Point | Shoe Type |
|---|---|---|---|---|
| 1720 | 6.0 | 150 | Heel | B |
| | 6.4 | 146 | Heel | A |
| | 6.4 | 146 | Heel | B |
| | 6.4 | 147 | Forefoot | B |
| | 6.4 | 148 | Heel | A |
| | 7.6 | 144 | Midfoot | A |
| | 7.6 | 149 | Heel | B |
| | 7.6 | 150 | Forefoot | A |
| | 8.0 | 149 | Heel | A |
| | 8.8 | 142 | Forefoot | B |
| | 8.8 | 150 | Heel | A |
| | 9.2 | 149 | Forefoot | B |
| | 9.2 | 152 | Midfoot | A |
| | 9.6 | 149 | Heel | B |
| | 11.2 | 138 | Heel | B |
| | 11.2 | 148 | Heel | A |
| | 12.4 | 140 | Midfoot | B |
| | 12.8 | 139 | Heel | A |
| | 13.2 | 140 | Midfoot | B |
| | 13.2 | 141 | Heel | A |
| | 13.2 | 142 | Midfoot | B |
| | 13.2 | 143 | Midfoot | A |
| | 14.0 | 139 | Midfoot | A |
| | 14.8 | 141 | Midfoot | B |

TOOL FOR DESIGN EXPERIMENTS WITH UNCONTROLLED FACTORS

CROSS-REFERENCE TO RELATED APPLICATIONS

This application claims the benefit of and priority based on 35 U.S.C. § 119 to U.S. Provisional Application No. 63/040,901, filed Jun. 18, 2020, the disclosure of which is incorporated herein by reference in its entirety.

BACKGROUND

In designing experiments, there may be controlled factors that are constrained to specified options in design cases for the experiment. For instance, there may be specific observed values for the controlled factors due to a limited number of samples or other resource constraints (e.g., an experiment may be for a group of people with factors of specified options such as height, weight, or gender). These factors may be referred to as covariate factors of a candidate set. There may also be other uncontrolled factors that are not bound to specified options. Assignable options may be assigned to these uncontrolled factors in the design (e.g., if the test is a clinical trial, different types of medications may be assigned to the group of people). There may still be some limits on the uncontrolled factors in the design (e.g., a total number of assignable placebo medications), but variation is still allowed in assigning for the design.

In some situations, all of the design cases are not used in constructing the design (e.g., a sample of the people is selected). In these situations, design cases must be selected, and options assigned to the uncontrolled factors.

SUMMARY

In an example embodiment, a computer-program product tangibly embodied in a non-transitory machine-readable storage medium is provided. The computer-program product includes instructions to cause a computing system to access design information for a design of an experiment. The design of the experiment comprises a selectable subset of multiple candidate design cases for a set of multiple factors. The design information comprises one or more uncontrolled factors of the set of multiple factors. The one or more uncontrolled factors have in each of the multiple candidate design cases specified options that are uncontrolled in generating the design of the experiment. The design information comprises one or more controlled factors of the set of multiple factors that each have assignable options that are controlled in generating the design of the experiment. The computer-program product includes instructions to cause a computing system to generate an initial subset of design cases of the multiple candidate design cases. The computer-program product includes instructions to cause a computing system to determine a criterion measure for the initial subset according to a design criterion for the design of the experiment. The computer-program product includes instructions to cause a computing system to index, in the initial subset, multiple data elements corresponding to at least one of the one or more uncontrolled factors and at least one of the one or more controlled factors. The computer-program product includes instructions to cause a computing system to generate the design of the experiment by, for each respective data element of the multiple data elements of the initial subset, determining a status indicating whether the respective data element corresponds to an uncontrolled factor or a controlled factor of the set of multiple factors. When the status indicates the uncontrolled factor of the set of multiple factors, the computing system determines if substituting a respective set of specified options of a respective candidate design case comprising the respective data element with a different set of specified options of the multiple candidate design cases improves the criterion measure according to the design criterion. When the status indicates the controlled factor of the set of multiple factors, the computing system determines if changing an assigned option of the respective data element improves the criterion measure according to the design criterion. The computer-program product includes instructions to cause a computing system to update the criterion measure with an updated criterion measure according to a change of the initial subset based on generating the design of the experiment.

In another example embodiment, a computing system is provided. The computing system includes, but is not limited to, a processor and memory. The memory contains instructions that when executed by the processor control the computing system to generate the design of the experiment.

In another example embodiment, a method is provided for generating the design of the experiment.

Other features and aspects of example embodiments are presented below in the Detailed Description when read in connection with the drawings presented with this application.

BRIEF DESCRIPTION OF THE DRAWINGS

FIG. 16A illustrates an example data set for uncontrolled factors in at least one embodiment of the present technology.

FIGS. 16C-D illustrate example subsets of candidate design cases in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
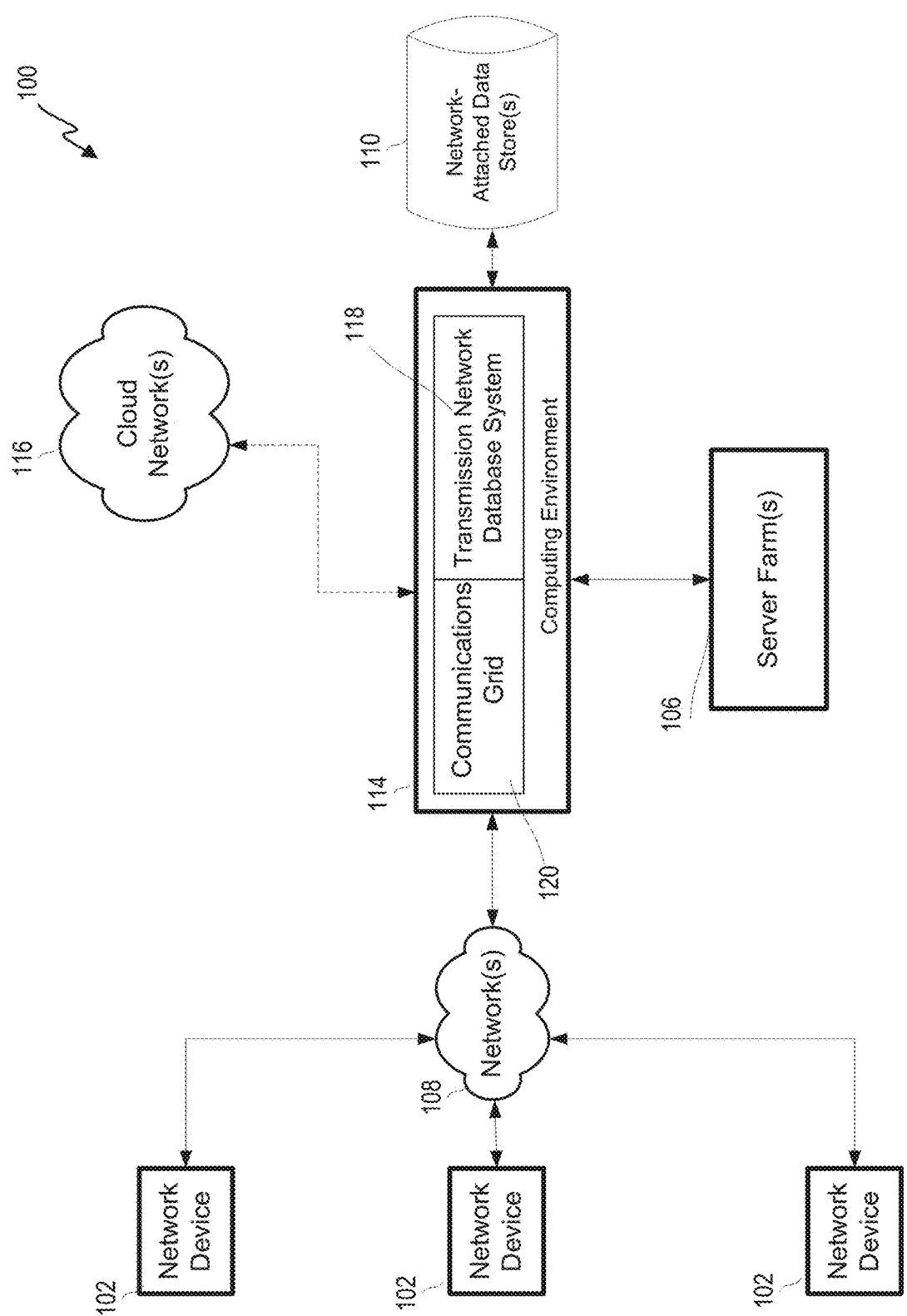
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
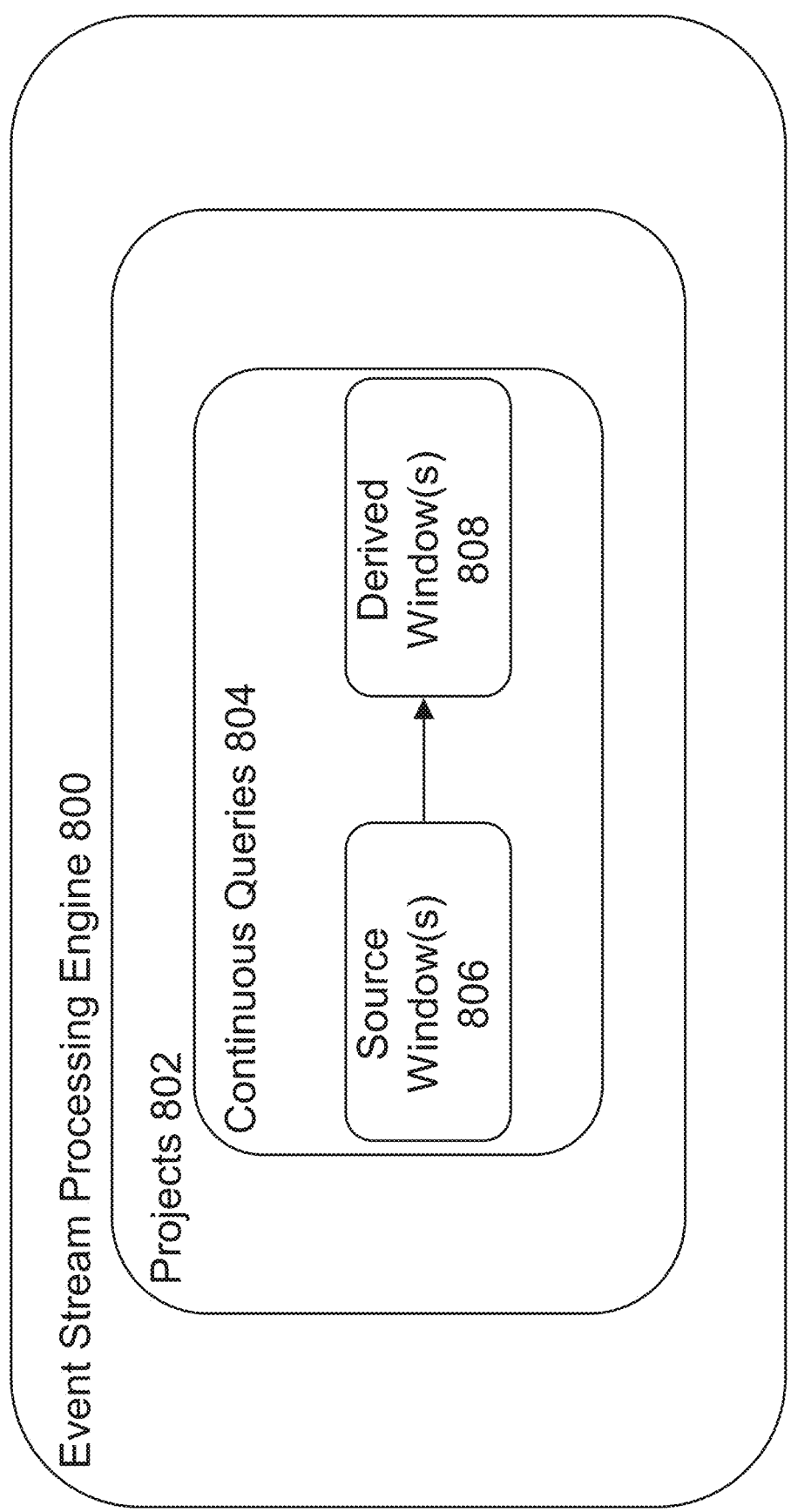
FIG. 8 illustrates a block diagram including components of an Event Stream Processing Engine (ESPE), according to at least one embodiment of the present technology.
Figure 9:
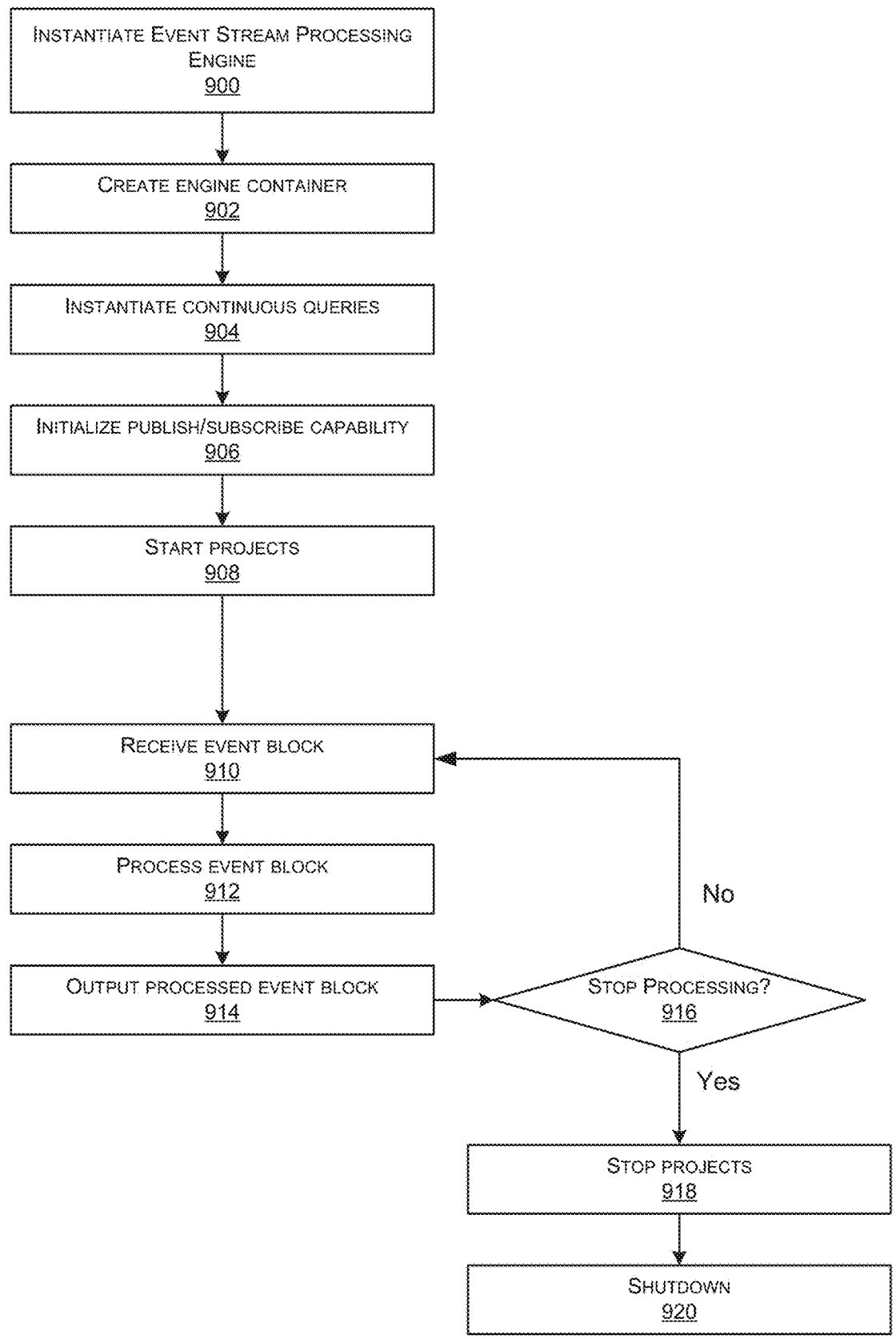
FIG. 9 illustrates a flow chart showing an example process including operations performed by an event stream processing engine, according to at least one embodiment of the present technology.
Figure 10:
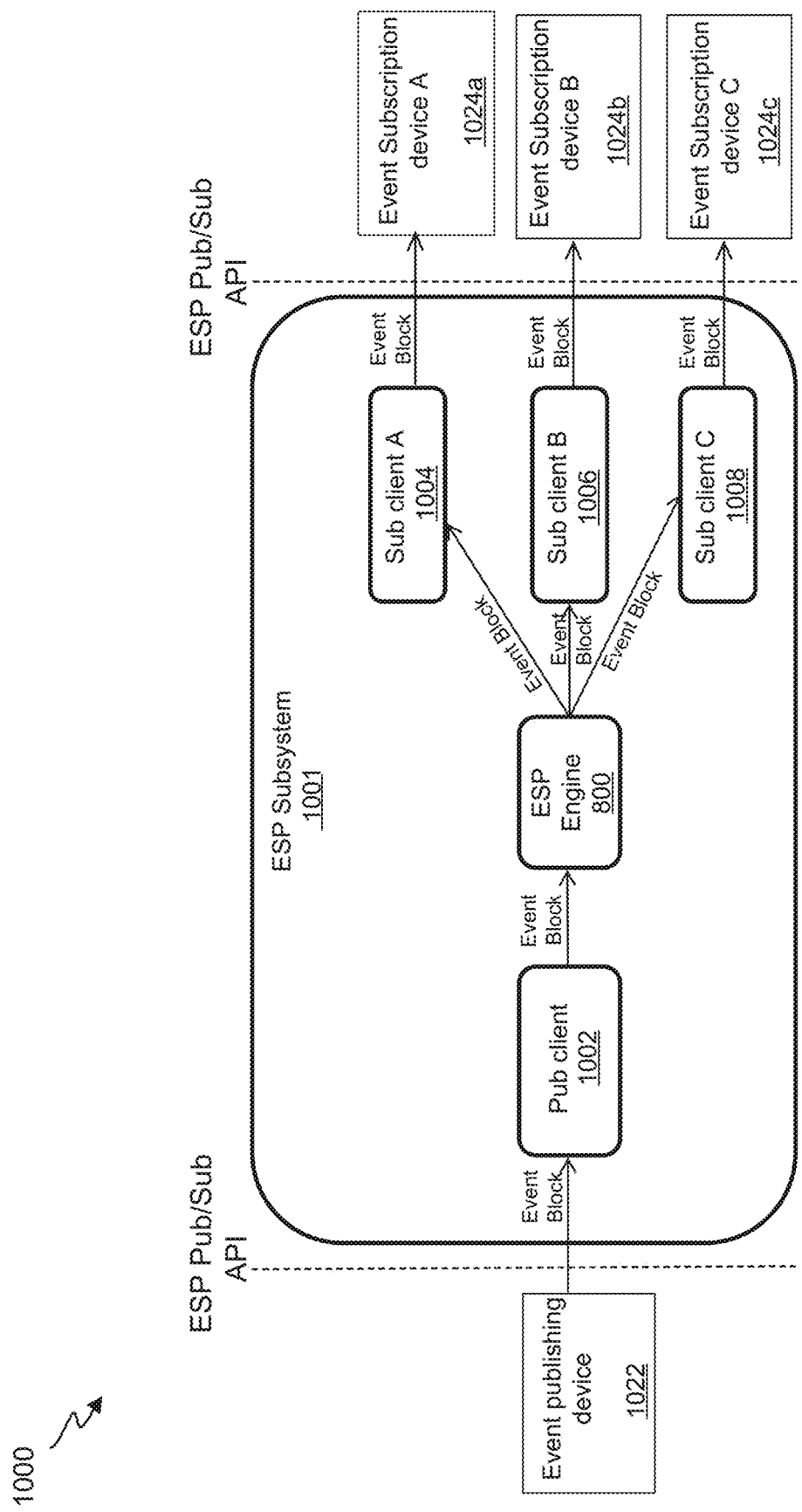
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
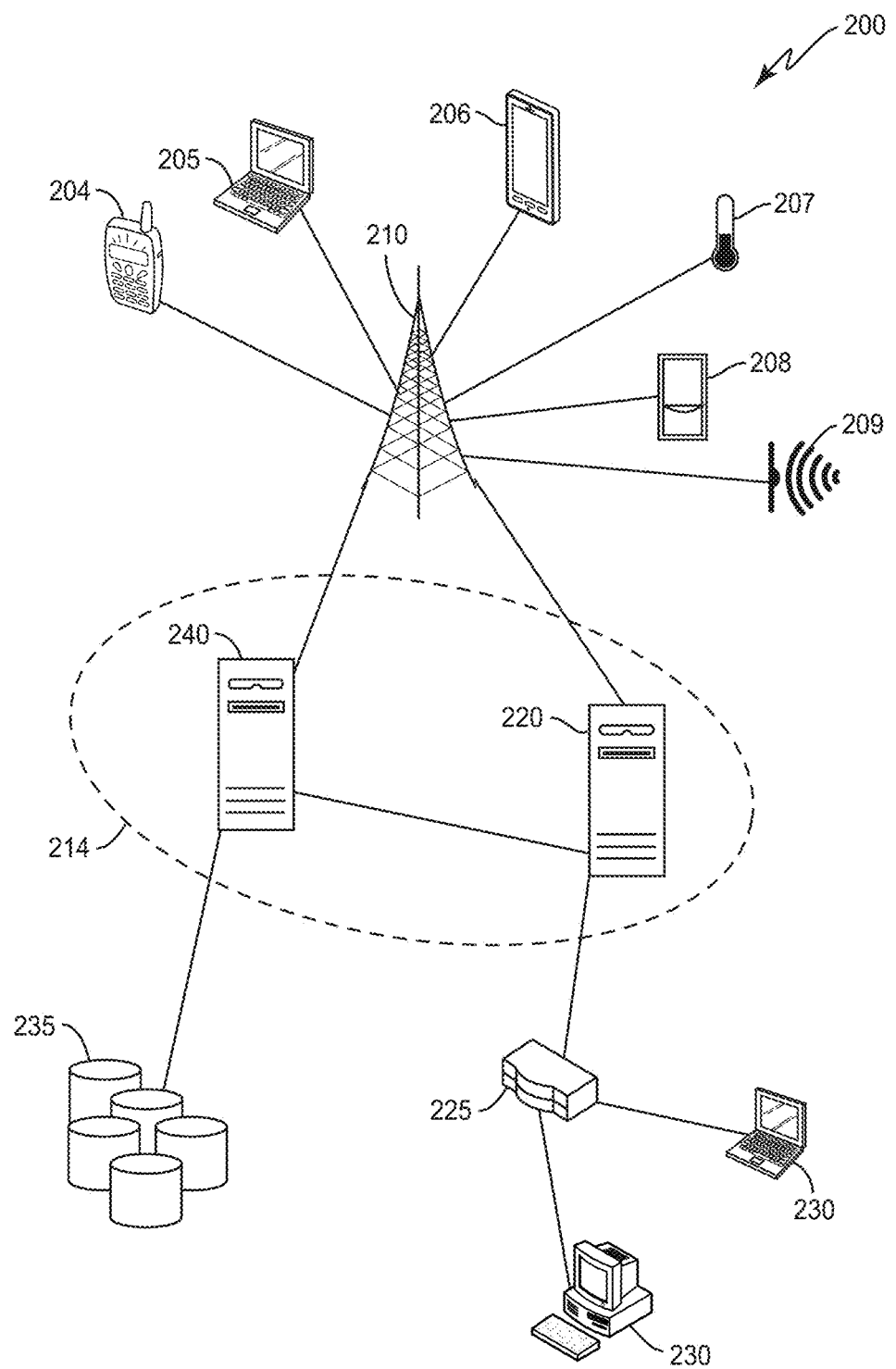
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
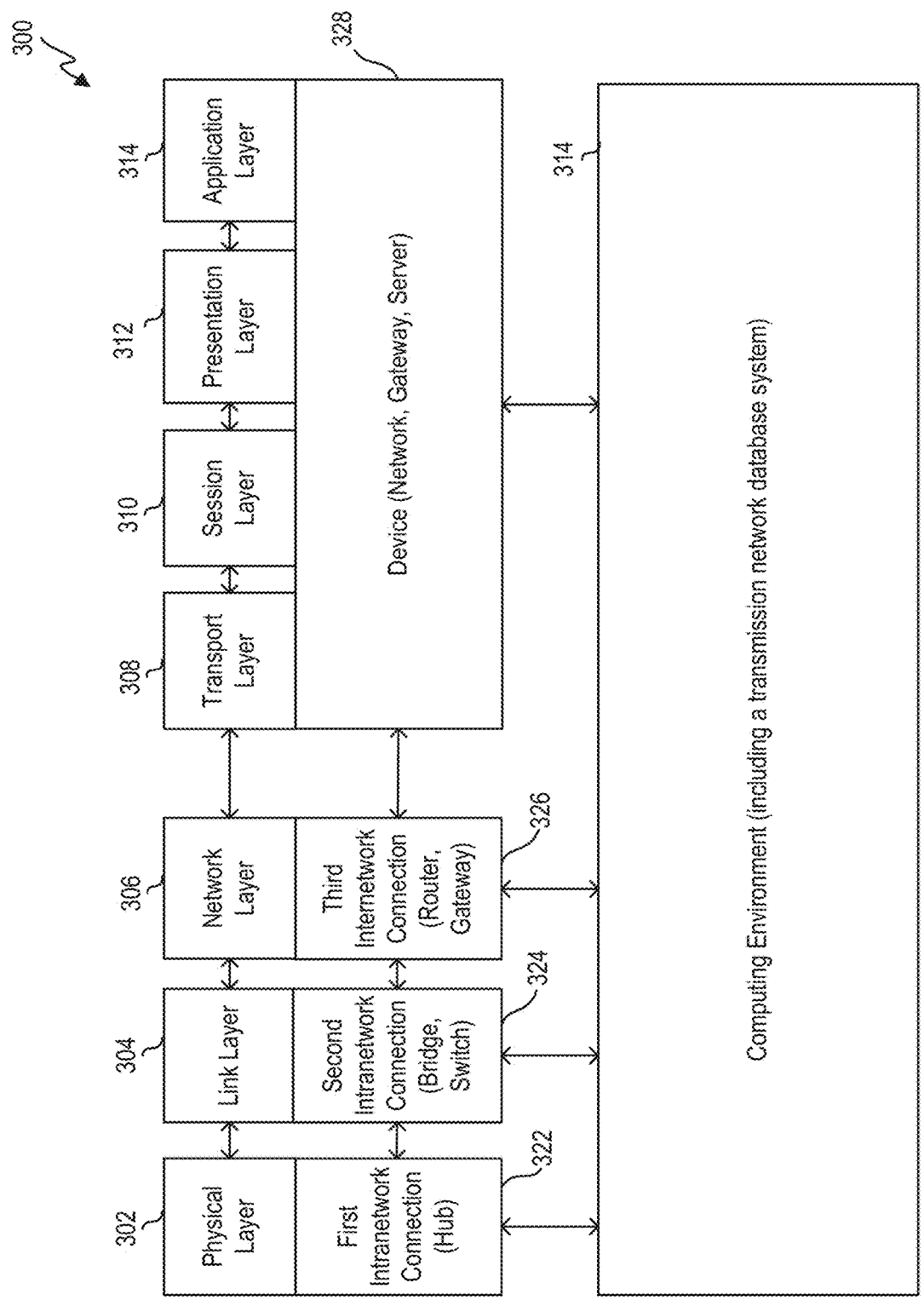
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
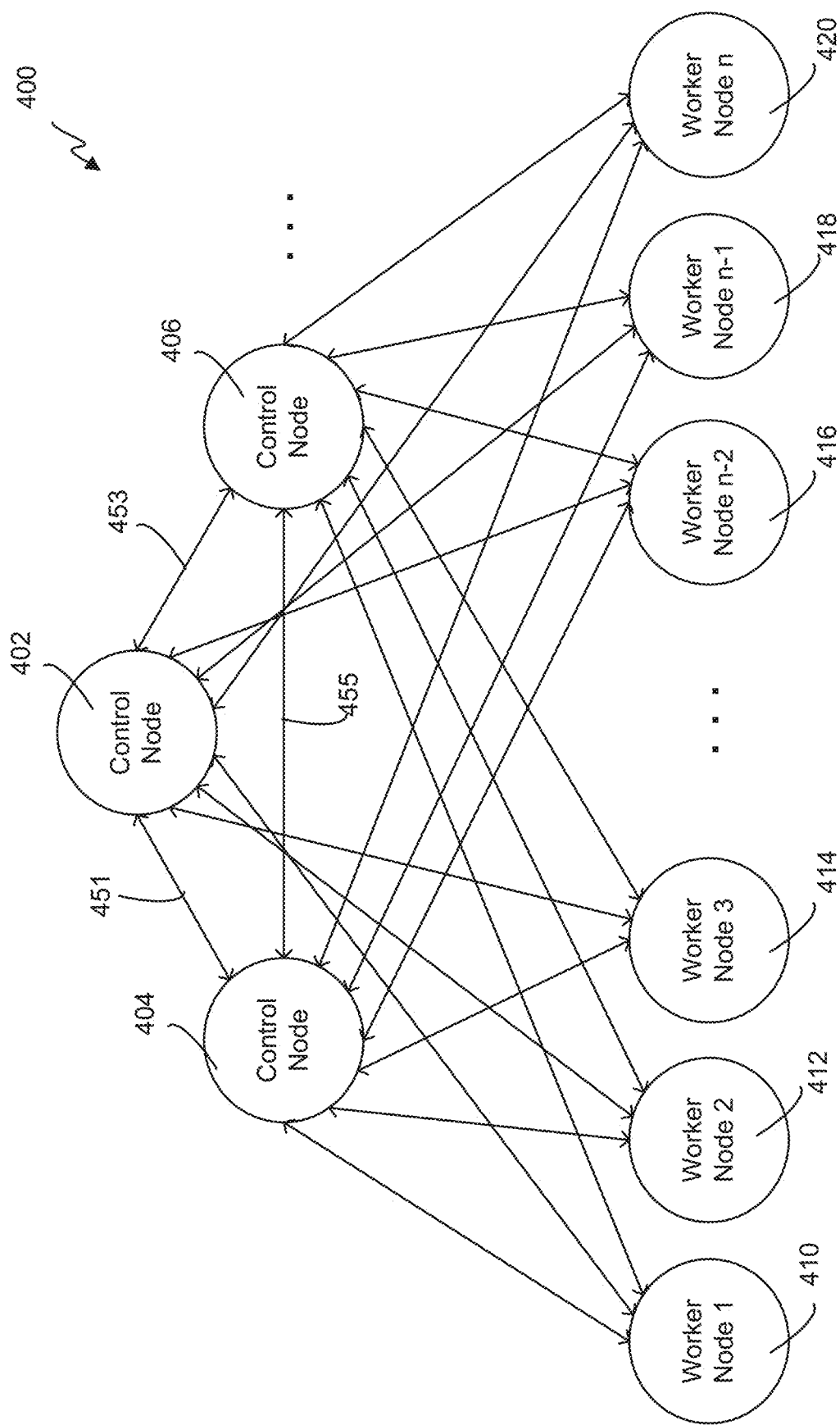
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
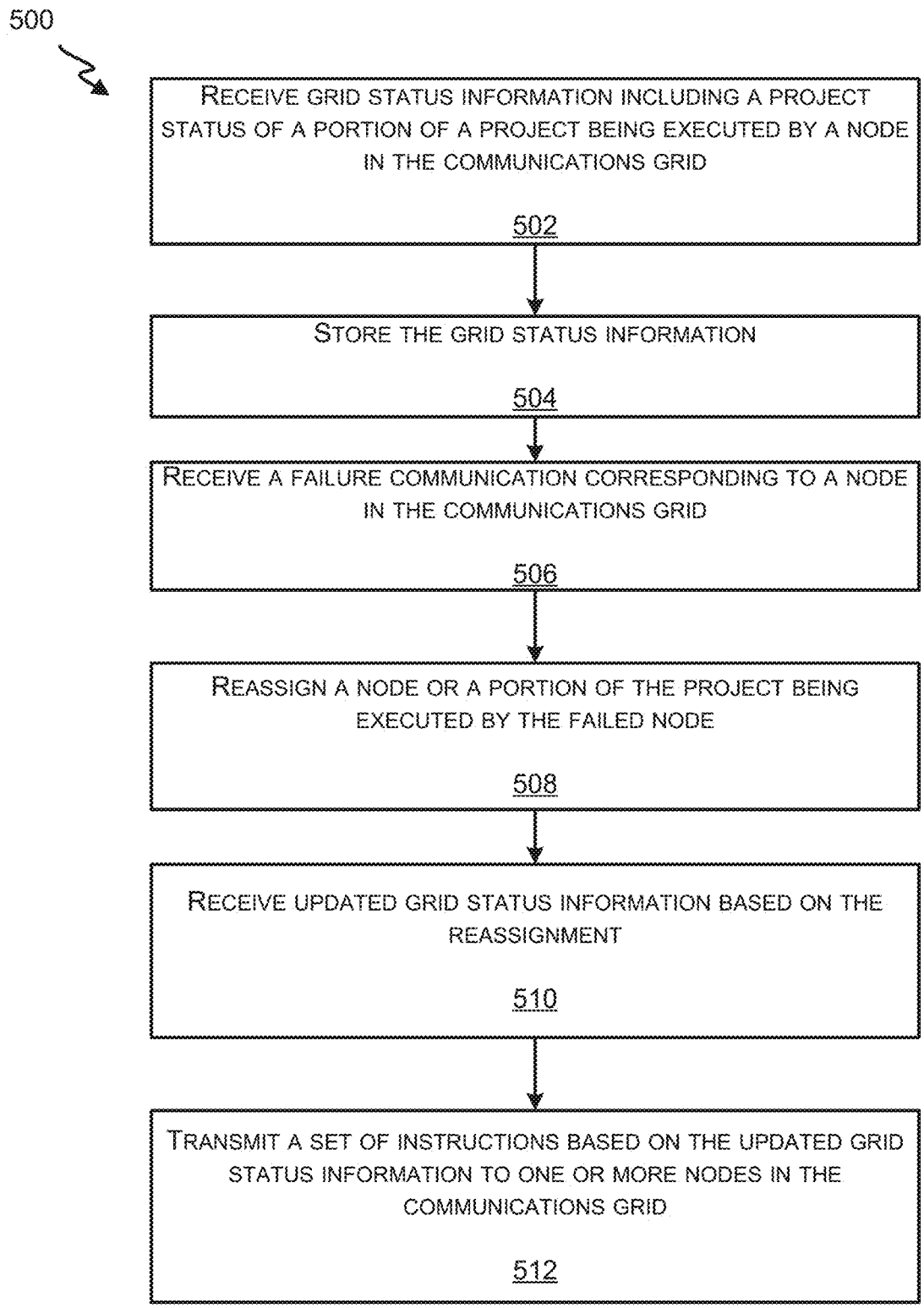
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
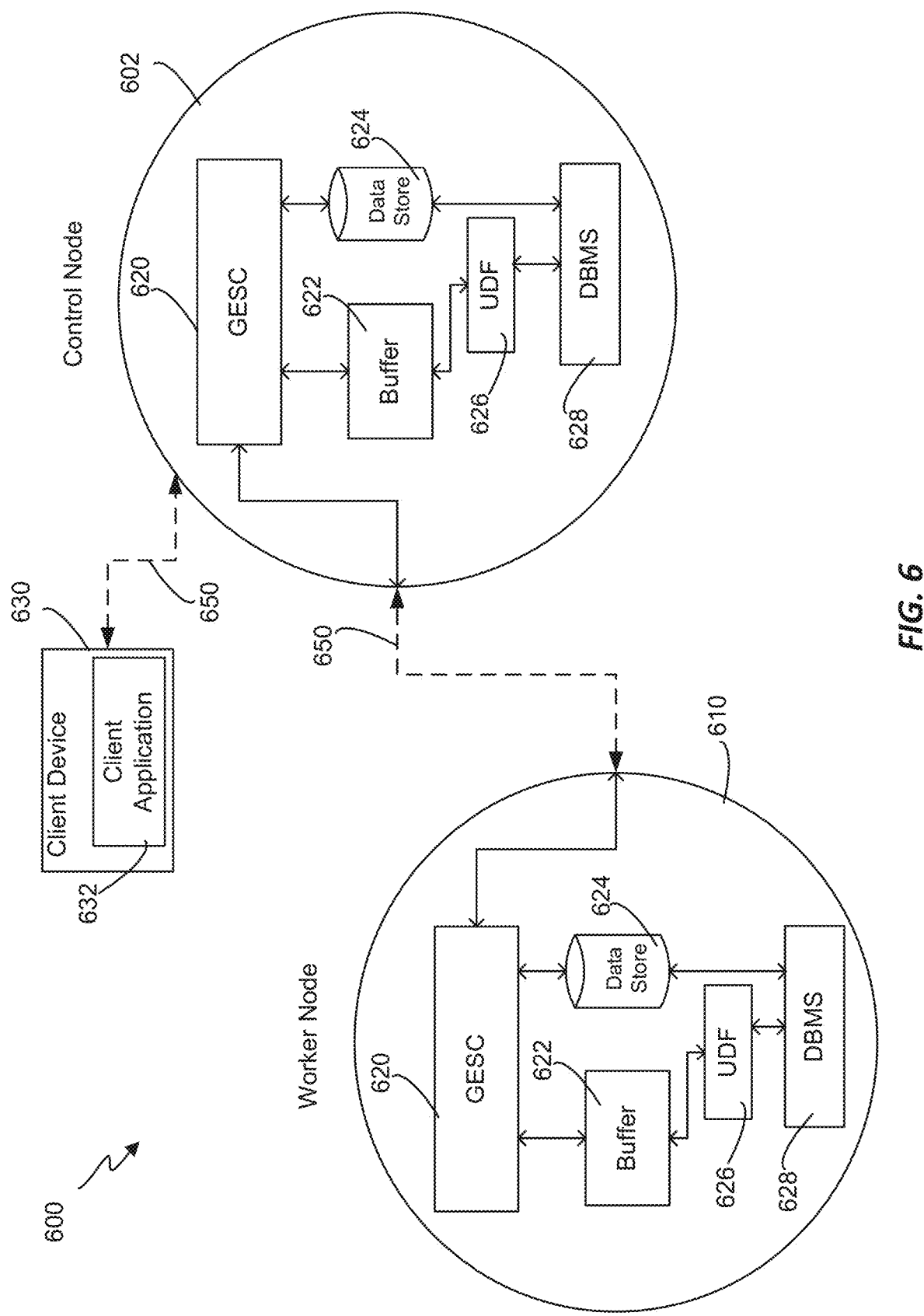
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
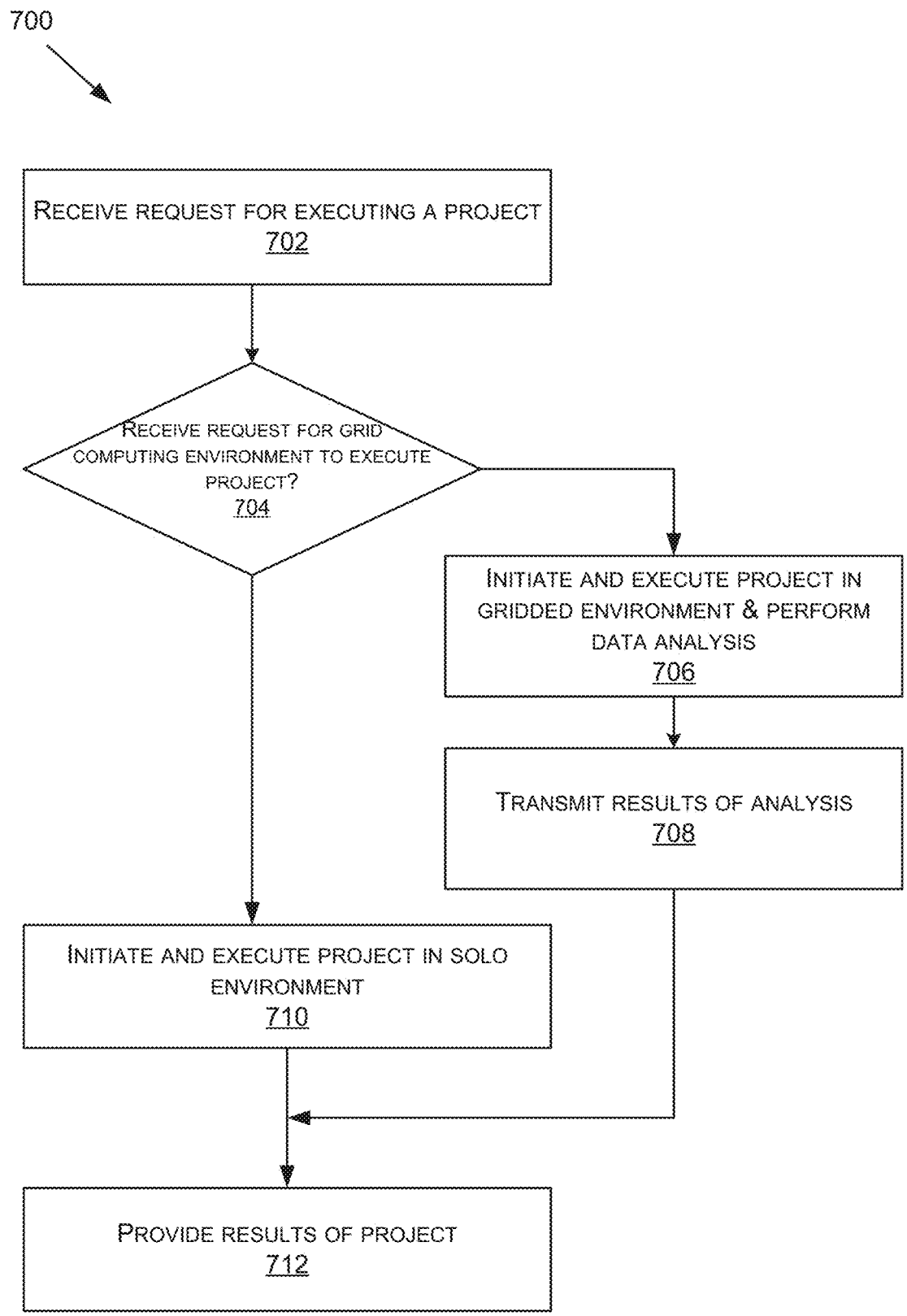
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
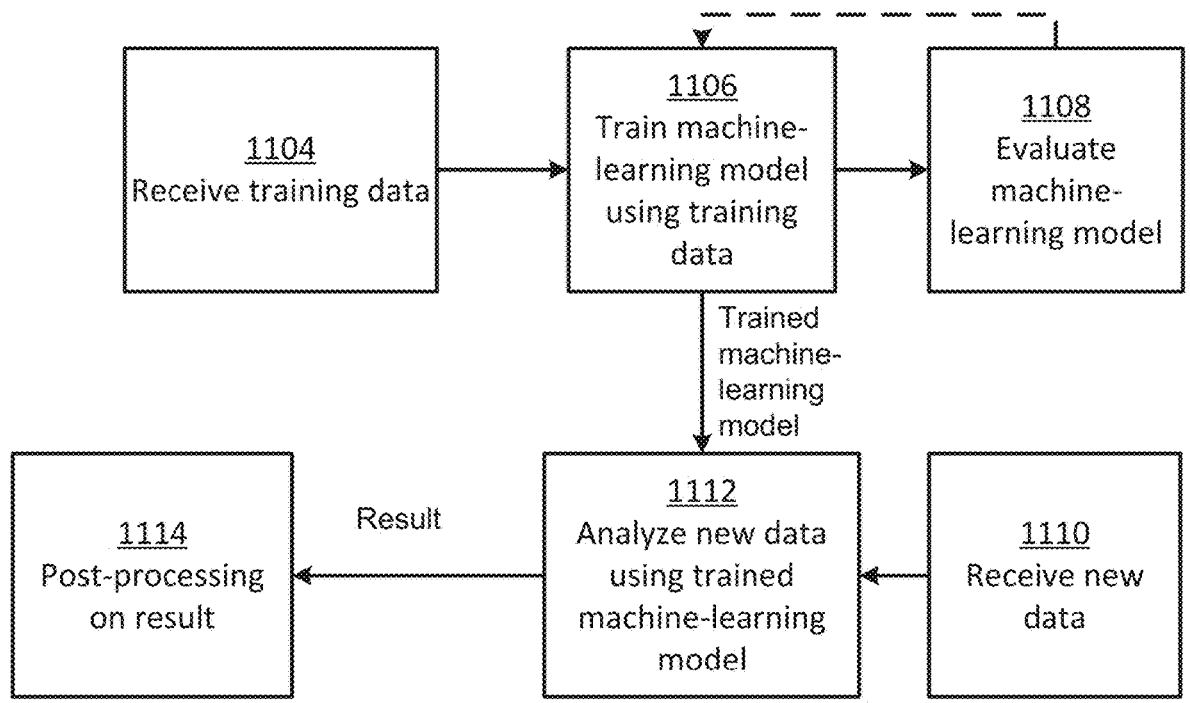
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
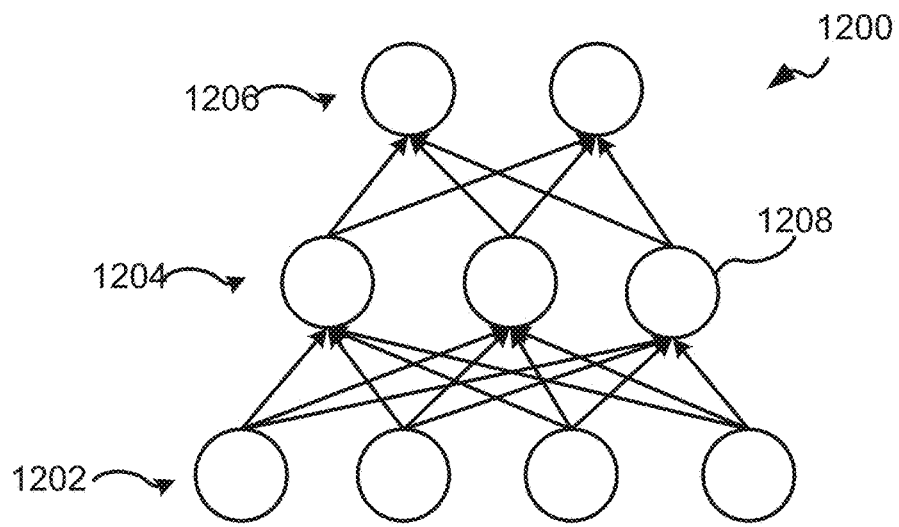
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
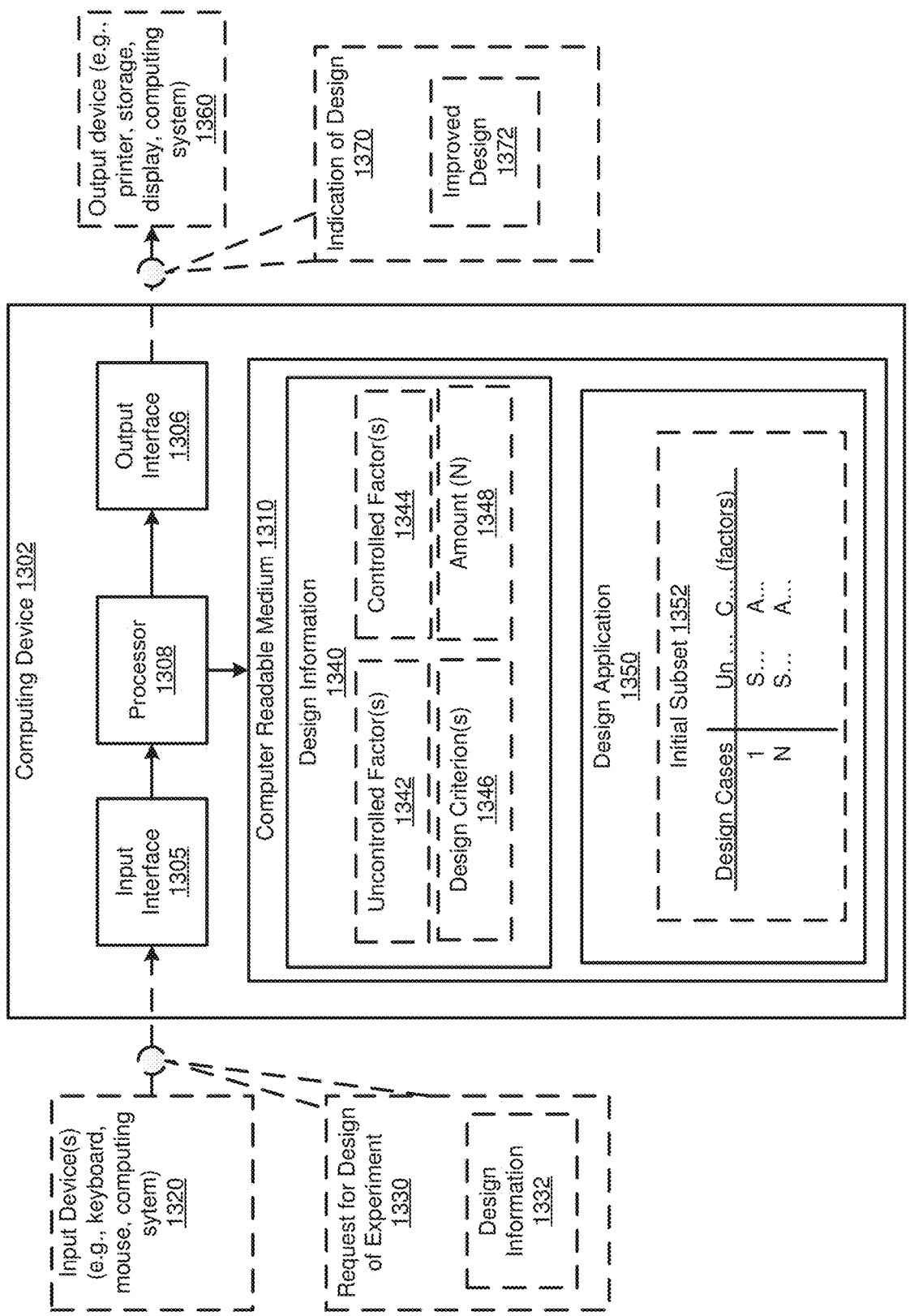
FIG. 13A illustrates an example block diagram of a system in at least one embodiment of the present technology.

FIG. 13A illustrates an example block diagram of a system 1300. System 1300 includes a computing device 1302. The computing device 1302 has a computer-readable medium 1310 and a processor 1308. Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

In one or more embodiments, the computing device 1302 may be used to generate a design of an experiment. The experiment may test outcomes for different options for different factors or variables in the experiment. A design of an experiment can include multiple design cases with options for each of a set of multiple factors. For instance, computer-readable medium 1310 may store design information 1340 such as one or more uncontrolled factors 1342 of the set of multiple factors. An uncontrolled factor may have in each of the multiple candidate design cases a specified option that is uncontrolled in generating the design of the experiment. For instance, in an experiment there may be multiple features of an environment or test set that cannot be changed. For example, in an experiment on different virus containment techniques in cities, there may be features of the cities that are observed (e.g., air quality, medium housing, and population density). As another example, the experiment may involve testing a quality of different shoes for runners and there may be features of the runners that are fixed (e.g., height, weight, gender). In experiments where there are multiple uncontrolled factors a design case may define a set of specified options for the multiple factors in each of the multiple candidate design cases (e.g., a design case may have a specified height and weight of a runner).

Experiments may also have one or more controlled factors 1344 of the set of multiple factors. A controlled factor can have assignable options that are controlled in generating the design of the experiment. For instance, the assignable options may correspond to different virus contaminant techniques to try in the cities (e.g., different antivirals or vaccines) or different shoes types to try on the runners. The computing device may store design information 1340 relating to one or more controlled factors 1344.

In one or more embodiments, the computer-readable medium 1310 may store more information than is used in generating the design of an experiment. For instance, the design of the experiment may comprise a selectable subset of multiple candidate design cases. For example, there may not be enough financial resources to give shoes to all of the runners or test out the virus contaminant techniques in all the possible cities. Even in scenarios where the experiment is conducted entirely virtually, there may be processing or time constraints that limit the number of different settings that can be tested. For instance, in an experiment to test different settings for a computer software, there may be some controlled factors of settings that must occur and must occur together, but some uncontrolled settings that can be independently tested in the computer software. Overall, there may be too many candidate design cases (e.g., too many setting options to test) given the processing or time constraints.

In one or more embodiments, the computing device 1302 can be used to generate a design (e.g., with a selectable subset of the multiple candidate design cases). For instance, in one or more embodiments, computer-readable medium 1310 stores instructions for execution by processor 1308 (e.g., instructions for design application 1350). For instance, design application 1350 can be used to access design information 1340 and generate an initial subset 1352 of design cases of the multiple design cases. In one or more embodiments, the design information 1340 comprises an amount 1348 of design cases (N). This amount can limit the number of design cases selected for the initial subset. For instance, the computing device 1302 can generate the initial subset by randomly selecting design cases of the multiple candidate design cases according to the amount 1348 of design cases.

In one or more embodiments, the computing device 1302 has one or more design criterions 1346 for generating a design. Design criterions can be used to evaluate the design (e.g., based on user objectives for the design). For example, popular design metrics for assessing experimental designs include Determinant-efficiency (D-efficiency) and Average-efficiency (A-efficiency). Efficiency criterions may also be referred to as optimality criterions. Other design metrics for evaluating experimental designs are described with respect to examples in more details herein. It is unlikely that a randomly selected subset of design cases would be the most optimal for one or more design criterions 1346 for generating a design. Techniques herein provide for generating a design in consideration of a design criterion (e.g., to modify an initial subset 1352).

For example, the design application 1350 can be used to determine a criterion measure for the initial subset 1352 according to a design criterion 1346 for the design of the experiment (e.g., a current D-optimality or I-optimality of the initial subset 1352) and improve upon this measure as described in more detail herein. The initial subset 1352 comprises multiple design cases. Each design case has specified options for one or more uncontrolled factors with assigned options for one or more controlled factors.

One or more applications stored on computer-readable medium 1310 (e.g., design application 1350) are implemented in software (e.g., computer-readable and/or computer-executable instructions) stored in computer-readable medium 1310 and accessible by processor 1308 for execution of the instructions. Processor 1308 can execute instructions (e.g., stored at the computer-readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 in one or more embodiments can retrieve a set of instructions from a permanent memory device and copy the instructions in an executable form to a temporary memory device that is generally some form of RAM, for example.

The one or more application can be integrated with other analytic tools. As an example, the design application 1350 can be integrated with a data analytics software application and/or software architecture such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

In one or more embodiments, processor 1308 operably couples with components of computing device 1302 (e.g., input interface 1305, with output interface 1306 and with computer-readable medium 1310) to receive, to send, and to process information.

For instance, the system 1300 optionally includes one or more input devices 1320 for receiving information. For instance, the design information 1340 is shown stored in computer-readable medium 1310. Alternatively, the design information 1340 can be stored elsewhere (e.g., on a computing system accessible by computing device 1302 using input interface 1305). Alternatively, or additionally, the computing device 1302 generates a design in response to a request 1330 for a design of an experiment (e.g., a user request). The request 1330 may include design information 1332. For instance, the request may comprise an indication of an amount of the selectable subset of the multiple candidate design cases. The selectable subset may be user defined (e.g., using one or more input devices 1320 such as a keyboard or mouse).

Alternatively, or additionally, the request 1330 may include other constraints on the design such as one or more design criterions 1346 or constraints on assigning options in the design. For instance, in the experiment regarding the virus containment techniques there may be a limited amount of each of the different types of vaccines that can be distributed across the cities. In generating the initial subset 1352 the computing device may randomly assign the assignable options to the initial subset of design cases according to the constraints on the assignable options, and further processing may be needed to modify the design and maintains those constraints. For instance, in an experiment regarding shoes, it may not be good in the experiment to assign all the shoes of one type to the tallest runners.

In one or more embodiments, the system 1300 optionally includes one or more output devices 1360 (e.g., one or more display devices) for outputting via one or more output interfaces 1306 an indication 1370 of a design. For instance, the indication 1370 of the design may be an improved design 1372 over the initial subset 1352. Alternatively, or additionally, the indication 1370 of the design comprises an updated criterion measure according to a change of the initial subset based on generating the design of the experiment. The output device(s) 1360 may include a display (e.g., with a graphical user interface) for displaying the indication 1370 of the design. The output device(s) 1360 may include a printer, storage, or other computing system for receiving the indication 1370 of the design.

The system 1300 is configured to exchange information between devices in the system (e.g., via wired and/or wireless transmission). For example, a network (not shown) can connect one or more devices of system 1300 to one or more other devices of system 1300. Alternatively, or additionally, the system is integrated into one device (e.g., a touch screen for entry of user defined aspects of design information 1340 and display of the indication 1370 of a design).

In one or more embodiments, fewer, different, and additional components can be incorporated into system 1300. For instance, in one or more embodiments, there are multiple input devices 1320 or computing systems. In the same or different embodiments, there are multiple output devices 1360 or computing systems. As another example, the same interface supports both input interface 1305 and output interface 1306. For example, a touch screen provides a mechanism for user input and for presentation of output to the user. Alternatively, the input interface 1305 has more than one input interface that uses the same or different interface technology. Alternatively, or additionally, the output interface 1306 has more than one output interface that uses the same or different interface technology. As another example, design application 1350 is shown as a single application for simplicity, but it may comprise multiple applications.

Figure 13B:
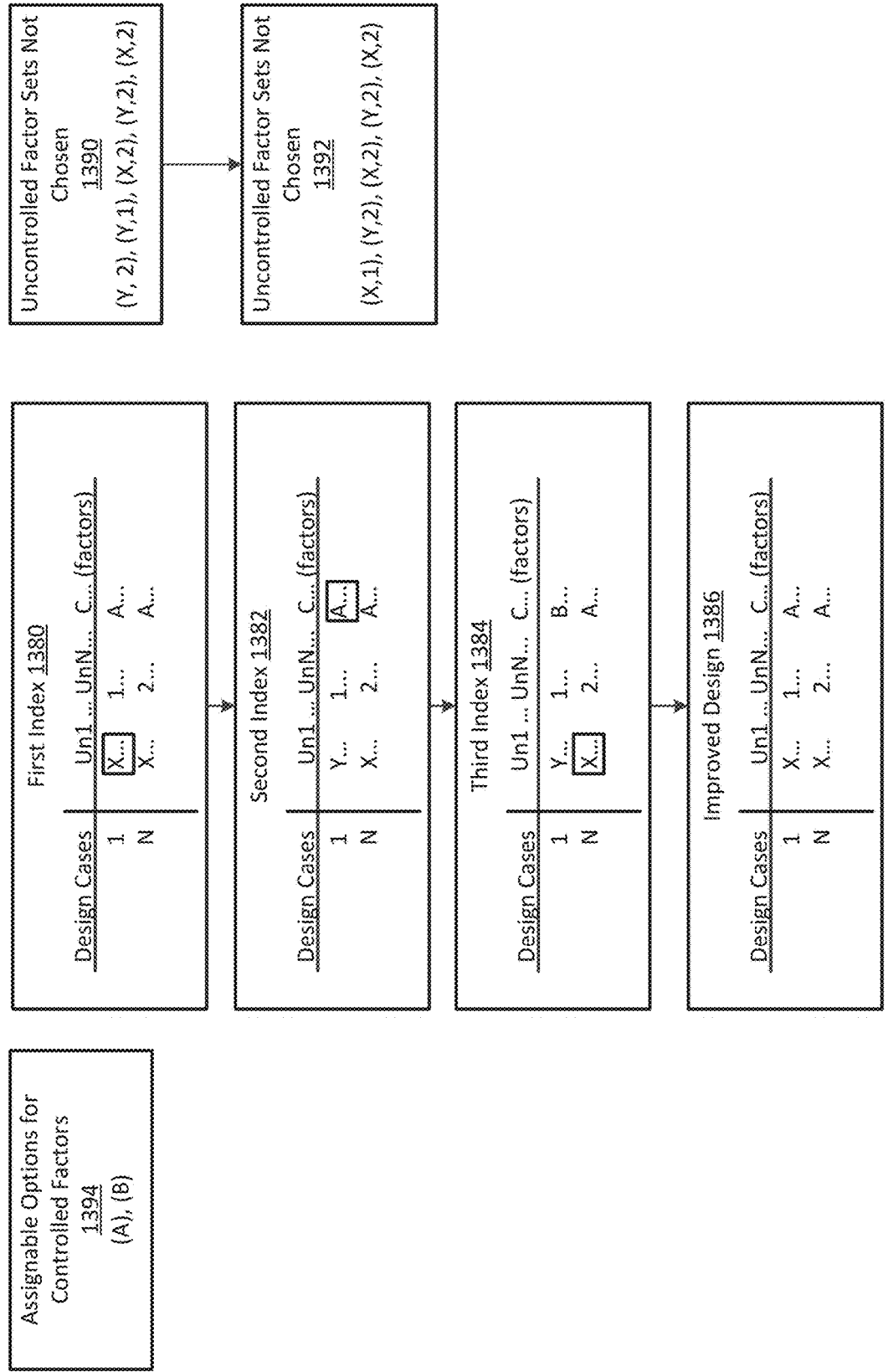
FIG. 13B illustrates an example of generating a design in at least one embodiment of the present technology.

FIG. 13B illustrates an example of generating a design by a computing system. A computing system described herein can be for example, a system 1300 or a device or application in system 1300 such as computing device 1302 or design application 1350. In one or more embodiments, a computing system indexes, in an initial subset (e.g., initial subset 1352), multiple data elements corresponding to at least one of the one or more uncontrolled factors and at least one of the one or more controlled factors. In this example, indexing of three data elements are shown as an example in first index 1380, second index 1382 and third index 1384.

In one or more embodiments, the computing system determines a status indicating whether a respective data element corresponds to a factor that is an uncontrolled factor or a controlled factor. For instance, a user or computing system may have defined a role for a particular factor in the design (e.g., as a controlled factor or uncontrolled factor type) and this may be associated with a particular data element. In the example in FIG. 13B, a first index 1380 shows indexing of a data element corresponding to a first uncontrolled factor in a first design case of an initial subset (e.g., initial subset 1352).

When the status indicates the uncontrolled factor of the set of multiple factors, the computing system determines if substituting a respective set of specified options of a respective candidate design case comprising the respective data element with a different set of specified options of the multiple candidate design cases improves the criterion measure according to the design criterion. In this example, the computing system samples uncontrolled factor sets 1390. These were the factor sets not included in the design cases of the initial subset shown in first index 1380. In this example, the uncontrolled factor sets gives specified values for the first uncontrolled factor and a second uncontrolled factor.

In one or more embodiments, the computing system tries one or more of the uncontrolled factor sets 1390. For instance, the computing device may determine if substituting a respective set of the specified options of the respective candidate design case (i.e., the set corresponding to (X, 1)) with the different set of the specified options of the multiple candidate design cases improves the criterion measure (e.g., the factor set corresponding to (Y, 2)) according to a design criterion. The computing system may test for improvement of a criterion measure for each unique combination of specified options of the multiple candidate design cases. In this example in FIG. 13B, there are two Y2 factor sets in uncontrolled factor sets 1390, so the computing system need not test each of those options. Alternatively, or additionally, the computing system randomly selects a defined amount of the available factor sets. In this case, the computing system makes a substitution in the first index 1380.

Second index 1382 shows a second indexing of the subset. As shown the uncontrolled factors have been changed from an (X, 1) case to a (Y, 1) case and the uncontrolled factor sets 1392 show a corresponding replacement of the (Y, 1) case to the (X, 1) case (e.g., because the change would improve a criterion measure according to a design criterion). Since the uncontrolled factors have a pre-defined pairing, they can be considered as a group and processing saved by indexing only one of the uncontrolled factors per design case. Alternatively, or additionally, the data elements can be indexed differently, such as indexing all the data elements, indexing sequentially through the design cases of the subset, or randomly indexing some of the data elements. Regardless of the indexing, in this second index 1382 the indexing of the data elements corresponds to a controlled factor that can have one of two assignable options 1394 (A or B).

When the status indicates the controlled factor of the set of multiple factors, the computing system determines if changing an assigned option of the respective data element improves the criterion measure according to the design criterion. In this example, the computing system considers assignable options 1394 (i.e., the computing system considers changing the A option to a B option in the indexed data element). As shown in a third index 1384 the computing system changed the assigned option A to an assigned option B (e.g., because the change would improve a criterion measure according to a design criterion). Each time a change is made, the computing device can update the criterion measure with an updated criterion measure according to a change of the initial subset based on generating the design of the experiment. Where the criterion measure is updated, the computing system is improving the design over the initial subset.

In the third index 1384, a data element is indexed that corresponds to the first uncontrolled factor in a N design case of the subset. As shown in improved design 1386 no change was made to this data element (e.g., because the change would not improve a criterion measure according to a design criterion). However, the improved design 1386 is considered an improved design over the initial subset because some changes were made in generating the design that improved a criterion measure for the design according to the design criterion.

In one or more embodiments, the number N of the design cases can be user defined. The computing system can output an indication of the design of the experiment by outputting to a graphical user interface the design of the experiment with the user defined amount of the subset of the multiple candidate design cases.

The design shown with respect to the second index 1382 or third index 1384 could be considered an intermediate design according to determining whether the respective data element corresponds to a factor that is a given uncontrolled factor or given controlled factor of the set of multiple factors for each of the indexed multiple data elements of the initial subset. The computing system can index subsequent data elements of the intermediate design or a further design based on the intermediate design (e.g., indexing the updated data elements). The computing system can keep processing indexed data elements to find the improved design 1386 (e.g., by generating a subsequent design by determining whether a subsequent data element corresponds to a factor that is an uncontrolled factor or a controlled factor of the set of multiple factors for each of the indexed subsequent data elements of the intermediate design or the further design based on the intermediate design).

Figure 14A:
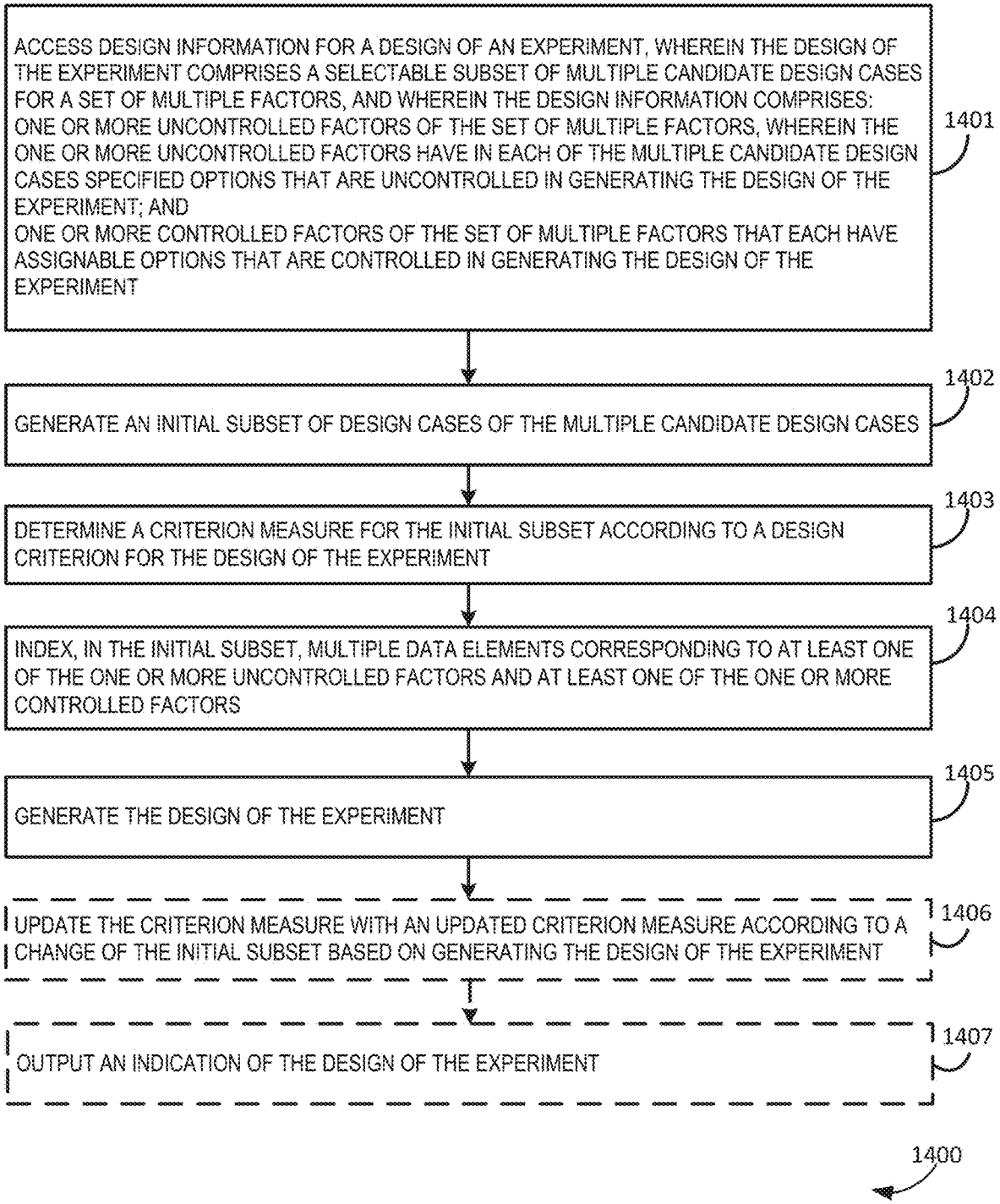
FIG. 14A illustrates an example flow diagram for outputting an indication of a design of an experiment in at least one embodiment of the present technology.

In one or more embodiments, the system 1300 implements a method as described herein (e.g., a method shown in FIG. 14A or FIG. 14B) for generating a design of an experiment. FIG. 14A illustrates an example flow diagram for a method 1400 for outputting an indication of a design of an experiment.

The method 1400 comprises an operation 1401 for accessing design information for a design of an experiment. The design of the experiment comprises a selectable subset of multiple candidate design cases for a set of multiple factors. The design information comprises one or more uncontrolled factors of the set of multiple factors. The one or more uncontrolled factors have in each of the multiple candidate design cases specified options that are uncontrolled in generating the design of the experiment. The design information comprises one or more controlled factors of the set of multiple factors that each have assignable options that are controlled in generating the design of the experiment. For instance, a computing system may access the design information in response to receiving a request for the design of the experiment. The request may include design information or design constraints described herein.

The method 1400 comprises an operation 1402 for generating an initial subset of design cases of the multiple candidate design cases. The initial subset can be selected randomly or in consideration of some design objective. For instance, a controlled factor in the initial subset can be set to be balanced in the design. As an example, an assignable option (e.g., different vaccine types) can be evenly distributed in design cases relative to an uncontrolled factor (e.g., an uncontrolled factor indicating a geographic location of cities). For instance, the initial subset can have different vaccine types starting out balanced evenly between northern and southern cities chosen in the initial subset.

The method 1400 comprises an operation 1403 for determining a criterion measure for the initial subset according to a design criterion for the design of the experiment. For instance, one type of design criterion is for a D-Efficiency, which is the efficiency of the design to that of an ideal or hypothetical orthogonal design in terms of the D-optimality criterion. A D-optimal design minimizes the volume of a confidence ellipsoid about the parameter estimates. A-Efficiency is the efficiency of the design compared or relative to that of an ideal or hypothetical orthogonal design in terms of an A-optimality criterion. An A-optimal design minimizes the average variance of the main effects of factors. Other optimality criterions are possible (e.g., a G-optimal design minimizes the maximum prediction variance for a given model and an I-optimal design minimizes the average variance of prediction).

Other criterion measures or evaluations could be made (e.g., Alias-Optimality, design creation time, etc.). Design creation time is useful in environments in which it may take greater computational time to compute a given experiment outcome based on levels selected for individual design cases.

The method 1400 comprises an operation 1404 for indexing, in the initial subset, multiple data elements (e.g., the indexing in FIG. 13B). In this example, the multiple data elements correspond to at least one of the one or more uncontrolled factors and at least one of the one or more controlled factors. However, the method 1400 is applicable to other examples where there is only one uncontrolled factor or one controlled factor.

Figure 14B:
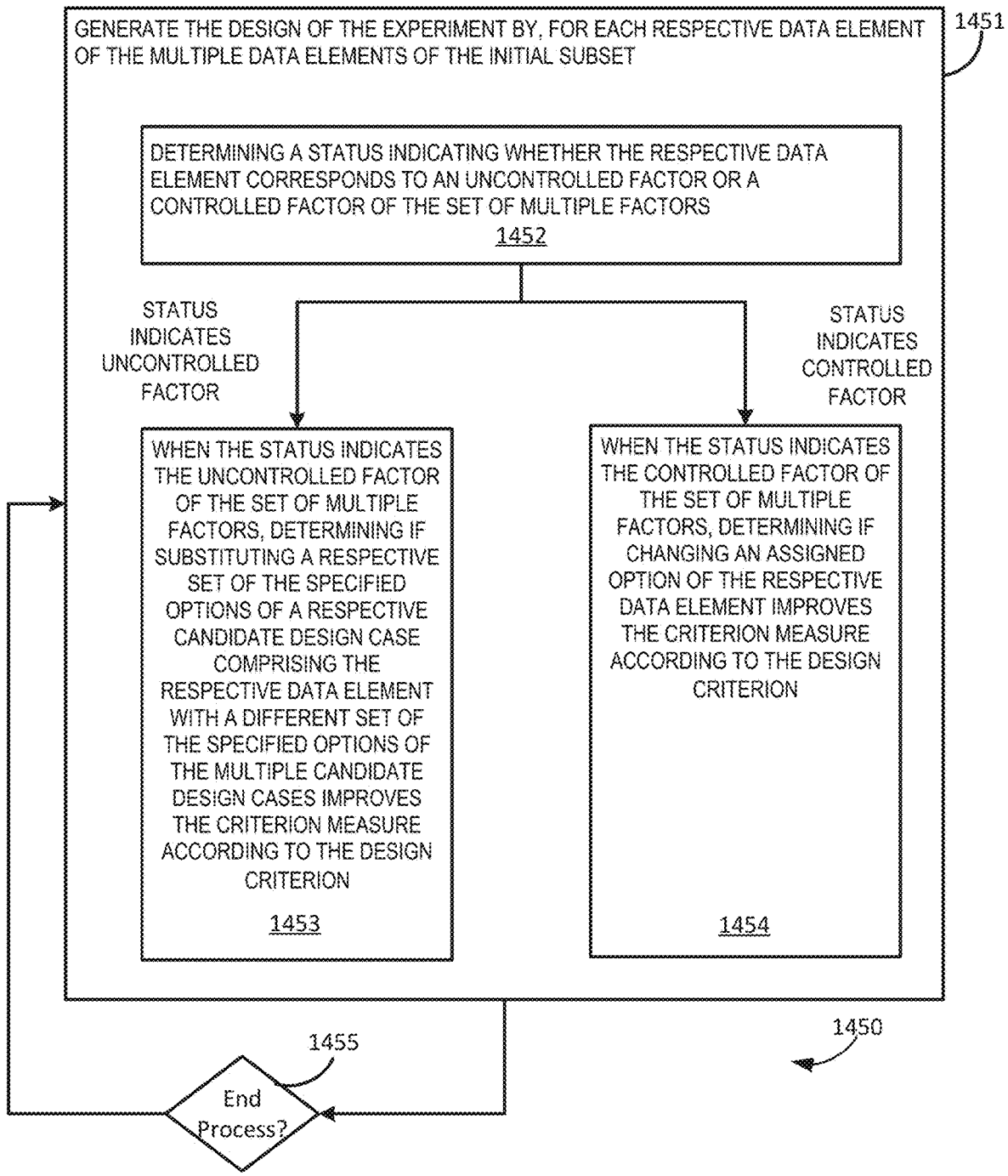
FIG. 14B illustrates an example flow diagram for generating a design in at least one embodiment of the present technology.

The method 1400 comprises an operation 1405 for generating the design of the experiment (e.g., as described in FIG. 13B and/or according to the method 1450 in FIG. 14B).

The method 1400 comprises an operation 1406 for optionally updating the criterion measure with an updated criterion measure according to a change of the initial subset based on generating the design of the experiment (e.g., if an improvement is found over the initial subset).

Additionally, or alternatively, the method 1400 comprises an operation 1407 for outputting an indication of the design of the experiment (e.g., outputting an updated criterion measure or outputting the design cases of the generated design).

FIG. 14B illustrates an example flow diagram for a method 1450 of generating a design (e.g., according to an operation 1405).

In this example, the method 1450 comprises an operation 1451 for generating the design of the experiment by, for each respective data element of the multiple data elements of the initial subset, determining a status indicating whether the respective data element corresponds to a factor that is an uncontrolled factor or a controlled factor of the set of multiple factors according to an operation 1452. The data elements may have been previously associated with a particular factor type (e.g., a user or computing system defined factor type). The computing system may determine the status based on this association.

When the status indicates the uncontrolled factor of the set of multiple factors, an operation 1453 comprises determining if substituting a respective set of specified options of a respective candidate design case comprising the respective data element with a different set of specified options of the multiple candidate design cases improves the criterion measure according to the design criterion. For instance, the computing system may substitute the respective set of the specified options of the respective candidate design case with a different set of the specified options of the multiple candidate design cases if it improves the criterion measure according to the design criterion (e.g., a remeasurement of the initial subset with the substitution would closer approach an optimum value for the design criterion than a previous measurement). In some cases, the computing system may make a substitution only if it improves the criterion measure.

Alternatively, when a change of an option of a data element of the initial subset would not improve the criterion measure according to the design criterion, the computing system may still substitute the respective set of the specified options of the respective candidate design case with the different set of the specified options of the multiple candidate design cases. For example, the computing system may have received an indication of a probability of changing the initial set when a change would not improve the criterion measure according to the design criterion (e.g., a user-defined probability to ensure at least some of the time a change is being made). The computing system may make a substitution based on the probability. As one or more embodiments herein improve the collective set of design cases for a design criterion, individual analysis of a design case may not indicate what will ultimately lead to a better collective set. On analysis of an individual case a substitution may appear to make no change or even a worse choice for one or more factors. However, by changing out some of these type of cases, a given substitution may ultimately produce a change in the criterion measure in the processing of the design for the better (e.g., by avoiding the design getting stuck in a local optimal). The computing system may use various methods for substituting (e.g., methods according to a row exchange approach).

When the status indicates the controlled factor of the set of multiple factors, on operation 1454 comprises determining if changing an assigned option of the respective data element improves the criterion measure according to the design criterion. For instance, the computing system may change the assigned option of the respective data element to a different candidate assignable option for the given controlled factor if it improves the criterion measure according to the design criterion. In some cases, the computing system may make a change only if it improves the criterion measure. Alternatively, when a change of an option of a data element of the initial subset would not improve the criterion measure according to the design criterion, the computing system may change (e.g., based on a received probability) the assigned option of the respective data element to a different candidate assignable option for the controlled factor. The computing system may use various methods for changing an assigned option (e.g., methods according to a coordinate exchange approach).

An operation 1455 can be used to determine when to end an operation in the method 1450. For instance, the computing system may determine an amount of the multiple data elements based on a processing constraint. The operation 1455 can be used to determine if the processing constraint has been reached and the number of data elements processed should be limited from further processing. Alternatively, or additionally, the computing system may determine an amount of the multiple data elements based on a number of times for determining that changing an assigned option in the initial subset failed to improve the criterion measure according to the design criterion (e.g., to limit the number of times operations 1454 is performed without advancing a user goal for the criterion measure). Alternatively, or additionally, the computing system may determine an amount of the multiple data elements based on a number of times for determining that substituting a set of specified options in the initial subset failed to improve the criterion measure according to the design criteria (e.g., to limit the number of times operation 1453 is performed without advancing a user goal for the criterion measure).

Figure 15A:
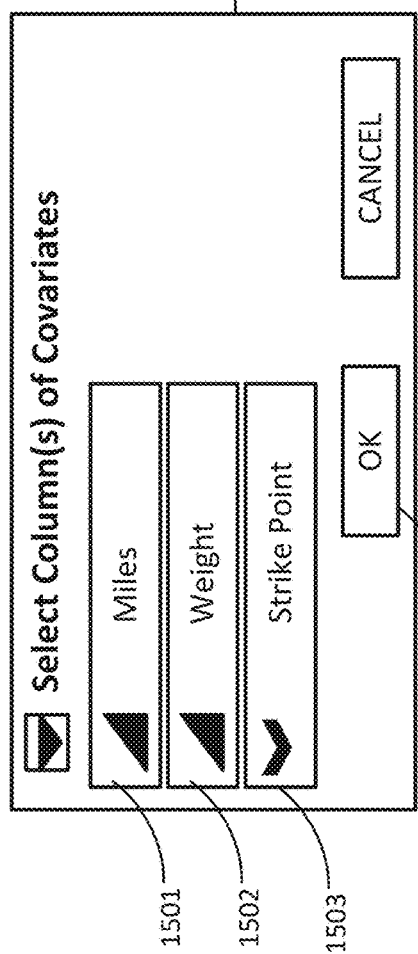
FIG. 15A illustrates an example graphical user interface for selecting uncontrolled factors in at least one embodiment of the present technology.

FIG. 15A illustrates an example graphical user interface 1500 for selecting uncontrolled factors in an example experiment for testing a shoe. In this example, the graphical user interface 1500 is displayed based on JMP® software provided by SAS Institute Inc. of Cary, N.C. in which uncontrolled factors are referred to as having a covariate factor role. By selecting covariates in the graphical user interface 1500, a user is selecting uncontrolled factors. In this example experiment there are 100 candidate runners for testing between two shoe types A and B. Information is known about the runners such as their weekly mileage run, weight of the runner, strike point, age, name, and gender). In graphical user interface 1500, the user has selected three uncontrolled factors: miles 1501, weight 1502, and strike point 1503. The user selects the OK control 1504 and those covariate factors now appear within the factors list in FIG. 15B.

Figure 15B:
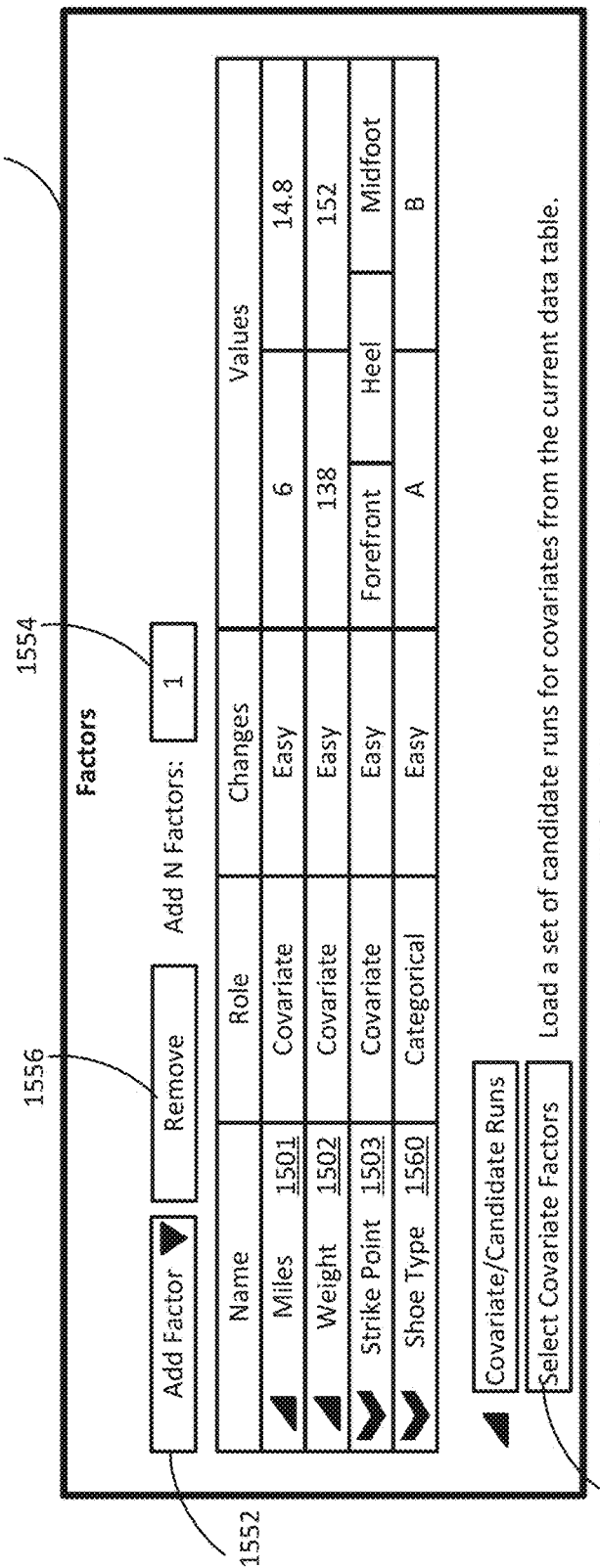
FIG. 15B illustrates an example graphical user interface for selecting controlled and uncontrolled factors in at least one embodiment of the present technology.

FIG. 15B illustrates an example graphical user interface 1550 for selecting uncontrolled factors and controlled factors (e.g., shoe type 1560). For example, the user can add N factors to textbox 1554 to specify a number of additional factors. In this example, the user has added a controlled factor of shoe type 1560. Add factor control 1552 can be used to specify information regarding the added factor such as a role type (e.g., categorical) or options for the factor (e.g., A or B). The remove factor control 1556 can be used to remove unwanted factors.

In this example, the controlled factor was specified to be a categorical factor by the user using the graphical user interface 1550. The categorical factor can have a pre-defined set of assignable options. In this case the user has predefined values of A and B to correspond to assignable options for the shoe type 1560 factor. Other factor role types are possible (e.g., a continuous factor where options are assigned from a pre-defined range). The continuous factor can be treated like a categorical factor with assignable options comprise a representative subset of possible options (e.g., end points of the pre-defined range). Alternatively, the assignable options can be assigned from all possible options within the pre-defined range.

In this example, the design information comprises multiple uncontrolled factors (e.g., miles 1501, weight 1502, strike point 1503) pertaining to the runners. The computing system can generate the initial subset of the design cases by assigning the assignable options for shoe type 1560 (e.g., A and B) to the initial subset of the design cases balanced with respect to a first uncontrolled factor of the multiple uncontrolled factors without regard to unbalance with respect to other uncontrolled factors of the multiple uncontrolled factors. For example, the design cases can be organized or sorted by weight 1502 and the options of the shoe type 1560 factor alternatingly assigned so that the shoe types are distributed across weight. However, this may mean that more shoes of type A are assigned to a runner with a strike point of forefront as opposed to type B.

In this example, the graphical user interface 1550 comprises a "select covariate factors" option 1558 to select the uncontrolled factors to access for the design information. FIG. 16A illustrates an example data set 1600 for with options for covariate factors. In one or more embodiments, a computing system presents a table in which the rows (e.g., of data set 1600) are selectable by the user or a computing system. For example, design cases referred to as runs can be presented in the Custom Design window under the Covariate/Candidate Runs in JMP®.

In one or more embodiments, the user presented with a table of candidate design cases may select particular design cases to include in a subset rather than allowing the computing system to select the design cases. Alternatively, or additionally, the user may further limit the uncontrolled factors (such as only miles 1501 and weight 1502) of a dataset comprising observed results for multiple uncontrolled factors.

Figure 16B:
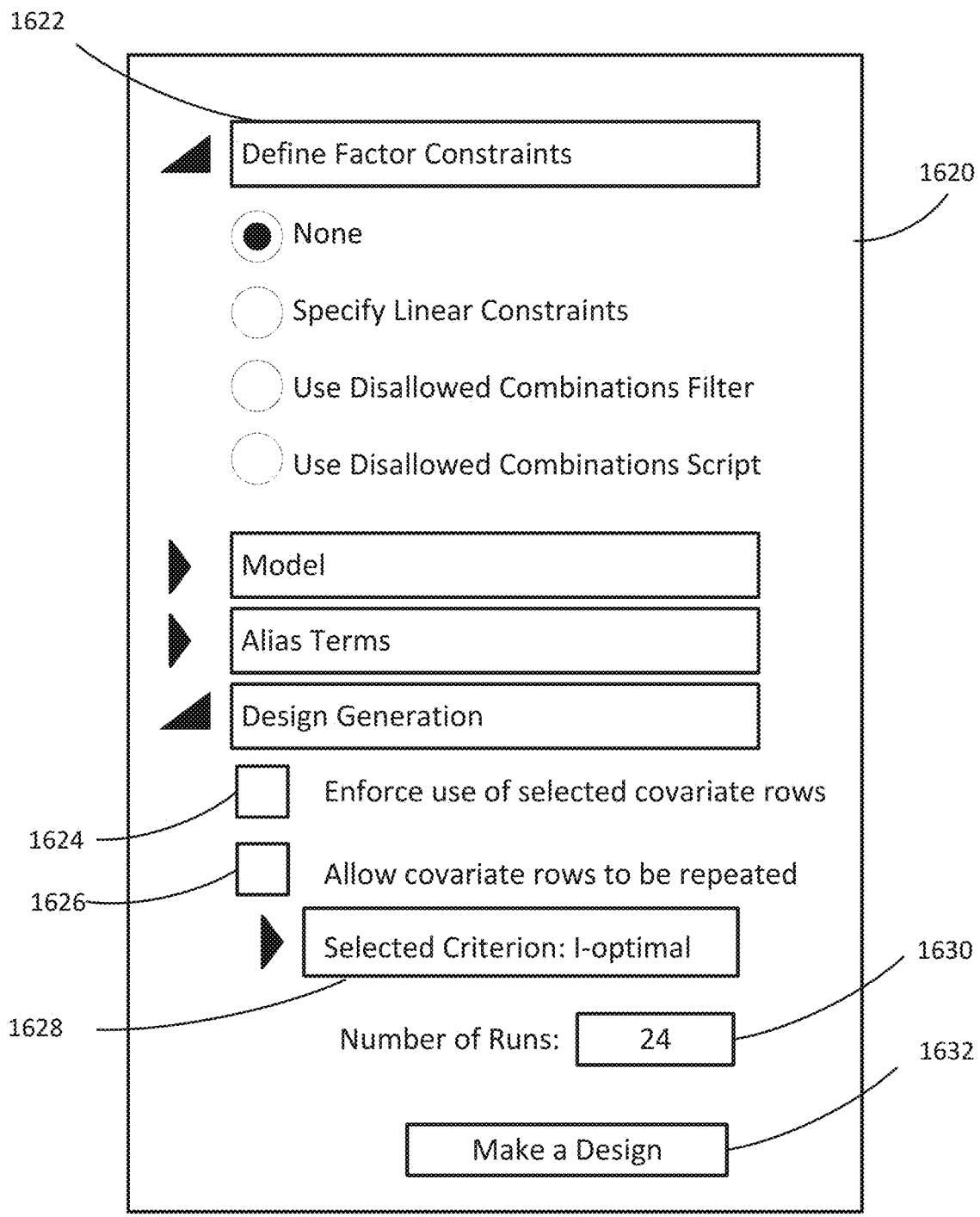
FIG. 16B illustrates an example graphical user interface for generating a design for an example data set in at least one embodiment of the present technology.

FIG. 16B illustrates an example graphical user interface 1620 for generating a design for an example data set. In this example, the user can provide additional constraints on the design. For instance, the user indicates the design should sample of 24 runners of the 100 possible runners. The user has constrained the number of runs or design cases to 24 in runs textbox 1630. The user has also selected a design criterion of I-optimal in criterion control 1628. In addition to choosing an I-optimal set from the 100 runners, the user has specified to give each runner one of 2 different shoe types, say A or B according to the controlled factor. Clicking Make Design control 1632 creates the design according to approaches described herein with 3 covariates, and 1 controllable factor according to the design criterion selected.

The user could have defined other constraints. For example, the user can define factor constraints 1622. In this example no further constraints are provided. However, in other experiments they may be useful. For instance, the user may use a disallowed combination filter or script to specify one or more disallowed combinations for the design. A given disallowed combination constrains the design of the experiment from having a first specified option or a first assigned option for a first factor of the set of multiple factors when a second specified option or a second assigned option for a second factor of the set of multiple factors is in the initial subset. For instance, in an experiment involving testing of vaccines in different cities it may be contraindicated to assign a particular type of vaccine to people over a certain age. Other factor constraints could be applied. For instance, a user could specify limitations in an experiment (e.g., due to available samples or other resource constraints) like needing 60 percent of runs to be for material A and 40 percent for material B.

Alternatively, or additionally, the user could have also selected the "Enforce use of selected covariate rows" checkbox 1624. If a practitioner wants particular rows to appear in the final design, selecting those rows and clicking the checkbox 1624 before selecting Make Design control 1632 will force those rows to be used by not letting them be removed from the design.

Alternatively, or additionally, the user could have selected the "Allow covariate rows to be repeated" checkbox 1626. When selected, the computing system need not record a covariate row as being used in the design so that it can appear more than once.

Alternatively, or additionally, one or more design options may be pre-specified as defaults (e.g., having checkbox 1624 or checkbox 1626 appear to the user initially as checked or unchecked).

FIGS. 16C-D illustrate example subsets of candidate design cases. In each there are 24 runners selected with assigned shoe types.

The design in FIG. 16C was generated using a two-step approach in which row exchanges were performed for the covariate factors (i.e., considering exchanging a set of specified options) and only considered a D-optimality criterion. Then in a second step coordinate-exchanges (i.e., considering changing a particular assignable options) was performed for the controllable factors with the rows from the candidate set fixed according the user-specified criterion, in this case I-optimality. In other words, only the assignable options considered a user-defined criterion, and only after selecting the specified options. If a user only had a candidate set (no controllable factors) row exchange would not use any other optimality criterion.

FIG. 16D shows an approach for generating a design in which coordinate-exchange and row-exchange could be considered for each indexed element of a design and a user-criterion could be considered for each indexed element of a design. In this example I-optimality was the considered criterion.

Figure 16E:
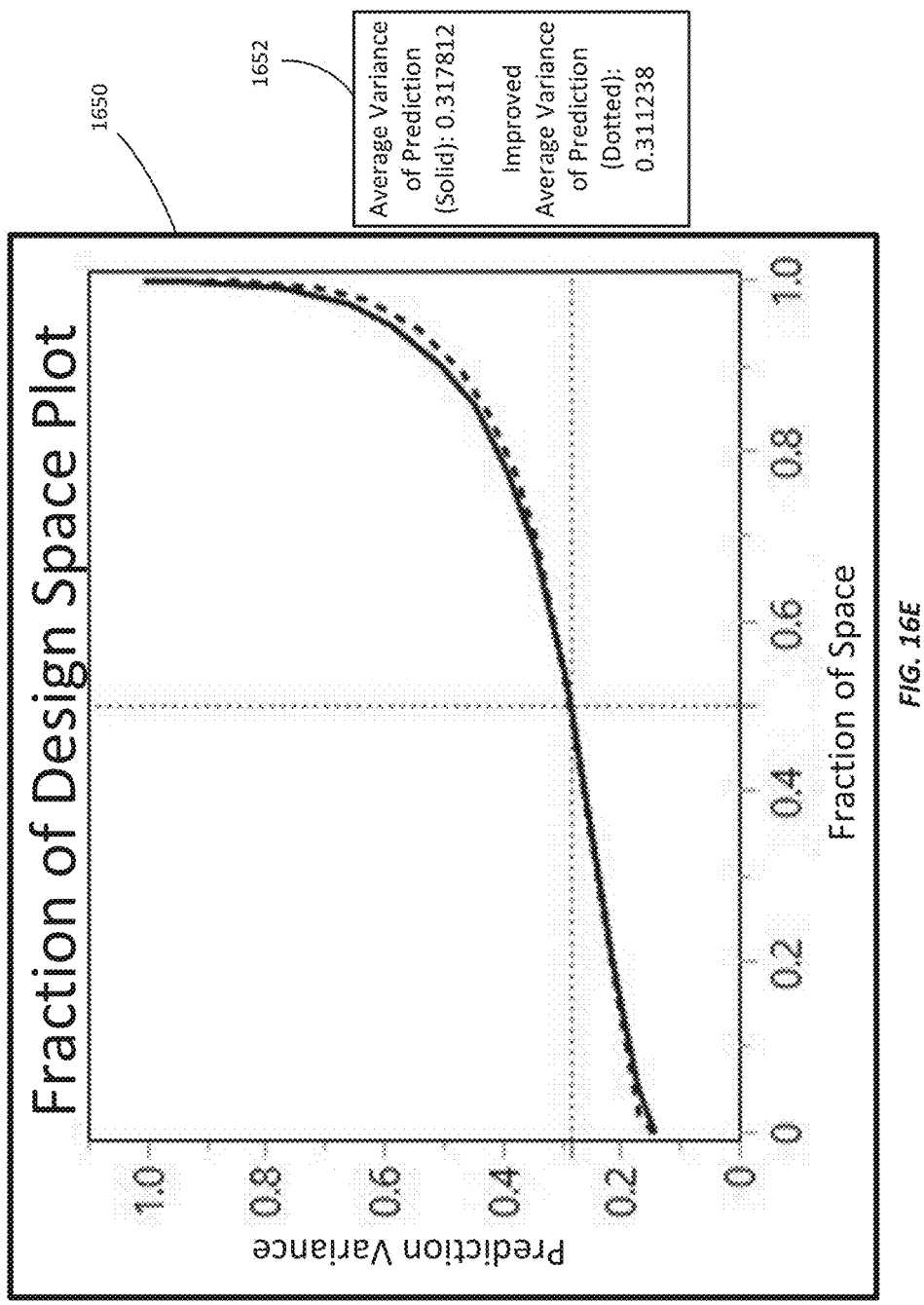
FIG. 16E illustrates performance results for an I-optimality criterion in at least one embodiment of the present technology.

FIG. 16E illustrates performance results for the I-optimality criterion for the designs in FIGS. 16C and 16D. With I-optimality a smaller measure is better since the I-optimal design tries to minimize the average variance of prediction. Key 1652 shows the average variance of prediction for the designs in FIGS. 16C and 16D. The average variance of prediction for the design in FIG. 16C is 0.317812. In contrast the average variance of prediction for the design in FIG. 16D is 0.311238. Accordingly, for I-optimality, FIG. 16D produced a better design than FIG. 16C.

A fraction of design space plot 1650 is also shown comparing the designs in FIGS. 16C and 16D across the design space. The dotted line corresponding to the design in FIG. 16D has better prediction variance across the design space as shown by gaps, on both ends of the design space, from the solid line corresponding to the design in FIG. 16C. These gaps shows that the design in FIG. 16D had lower values than the design in FIG. 16C.

Figures 17A, 17B:
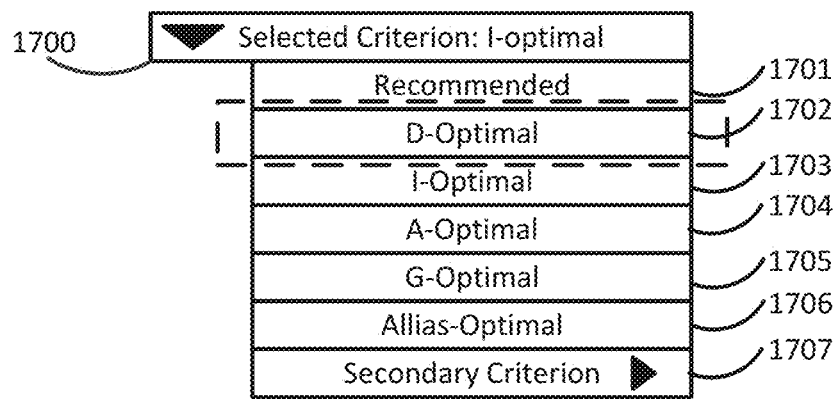
FIG. 17A illustrates an example graphical user interface for selecting one or more design objectives in at least one embodiment of the present technology.
FIG. 17B illustrates an example subset of candidate design cases in at least one embodiment of the present technology according to a D-optimality criterion.

FIG. 17A illustrates an example graphical user interface with a drop-down menu 1700 for selecting one or more design objectives. In this example, the user changes the selection criterion from one of I-optimality criterion 1703 to D-Optimal criterion 1702. The user could have changed to other criterions (e.g., A-Optimal criterion 1704, G-Optimal Criterion 1705, or Alias-Optimal criterion 1706). Further, a user could allow the computing system to select the criterion (e.g., by selecting a recommended criterion 1701 which could correspond to a computing system default). In one or more embodiments, the user specifies multiple criterion (e.g., by selecting a criterion from secondary criterion drop-down menu 1707).

FIG. 17B illustrates an example subset 1720 of candidate design cases according to the D-Optimal criterion 1702 selected in the drop-down menu 1700 of FIG. 17A. The different optimality criterion produces a different design than the designs shown in FIGS. 16C and 16D.

Figure 17C:
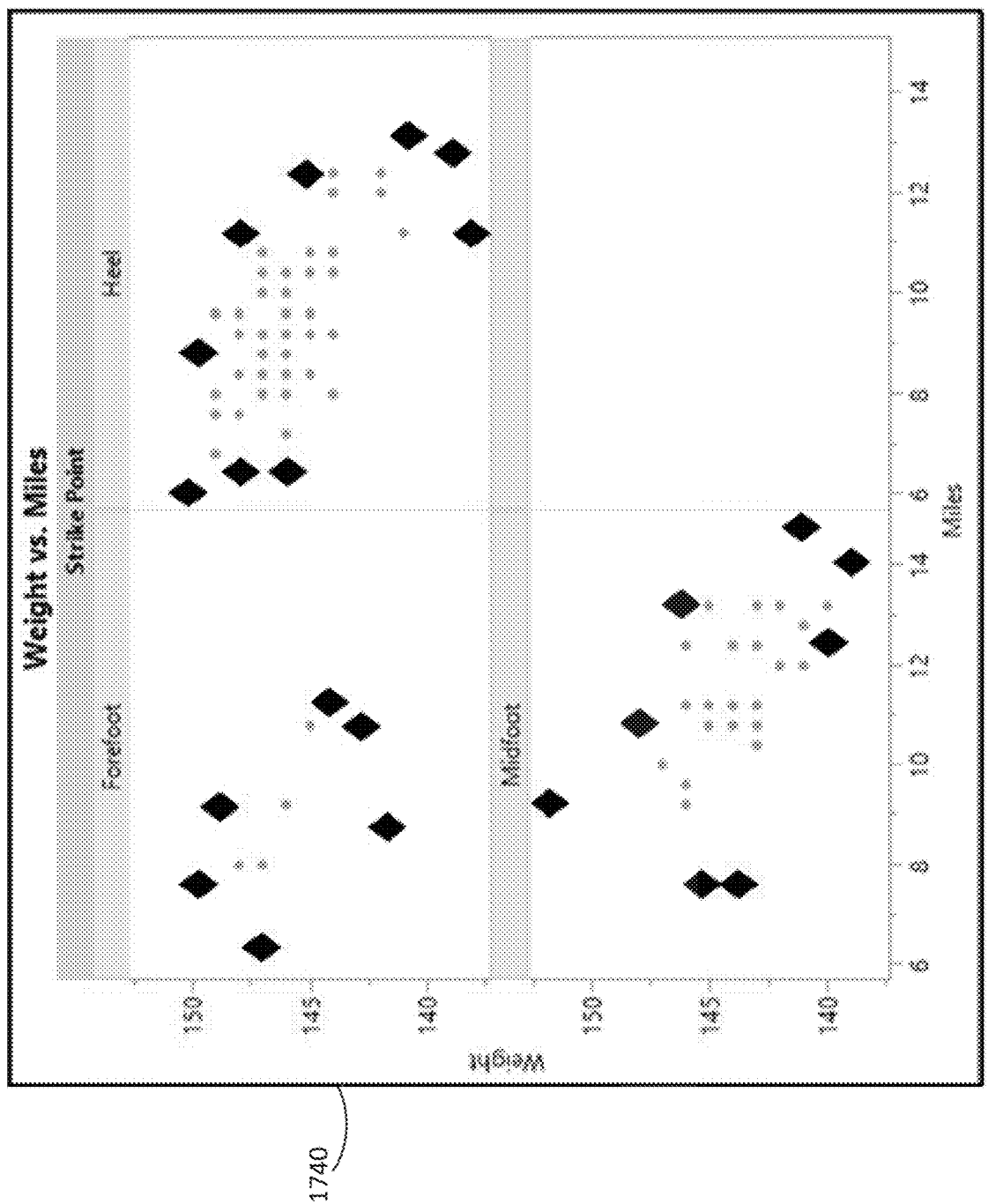
FIG. 17C illustrates performance results for a D-optimality criterion in at least one embodiment of the present technology.

FIG. 17C illustrates performance results for the D-optimality criterion 1702. The black diamonds in the weight vs. miles plot 1740 represent the selected cases of all candidate cases. The gray dots represent the unselected cases of all candidate cases. As shown the selection has done a good job selecting cases on the extremes of weight and height for each of the different types of foot strikes.

As shown by the designs in FIGS. 16D and 17B, embodiments herein can definite an initial subset (e.g., a computing system randomly choosing rows from the candidate set for the covariates, and randomly assigning values to the controllable factors). A computing system can apply different optimality criterions and for each row of a design (e.g., an initially selected subset), index inputs (e.g., randomly) and apply a row or coordinate exchange algorithm over each row of the subset. The row or coordinate exchange algorithm can be repeated a set number of times or until no improvement is found (e.g., improvement for one or more selected optimality criterions). Further, different initial subsets can be considered and this process of indexing and exchanging repeated for each initial subset (e.g., a set number of times or according to a set time frame). For instance, the initial subset may be selected according to different design criterions of multiple design criterion options. The considered design criterion in the process of exchanging values in the subset may be according to a different one of the different design criterions. FIGS. 18, 19A, 19B, 19C, and 20 illustrate different workflows according to embodiments for this process.

Figure 18:
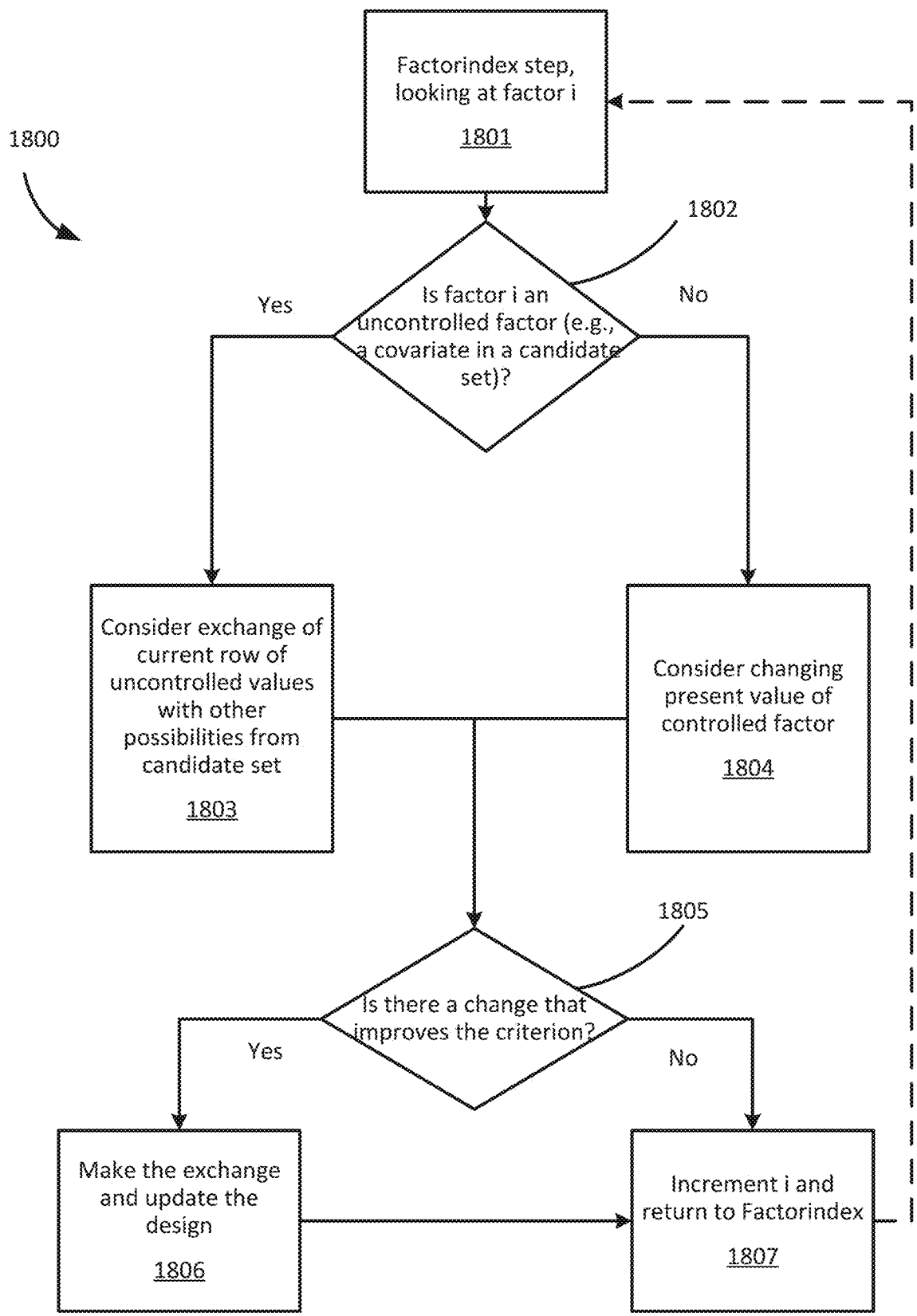
FIG. 18 illustrates an example flow diagram for modifying an indexed initial subset in at least one embodiment of the present technology.

FIG. 18 illustrates an example flow diagram 1800 for modifying an indexed initial subset. In this flow diagram 1800, each row of an initial subset has been randomly indexed by indexes referred to as Factorindex in operation 1801. The computing system has derived the initial subset by randomly selecting design cases comprising one or more uncontrolled factors and assigning to one or more controlled factors in the initial subset options, from a pre-defined set of assignable options, to design elements corresponding to the one or more controlled factors in the initial subset of design cases.

Operation 1801 begins by a computing system considering a factor i of Factorindex. In an operation 1802 the computing system considers whether factor i is an uncontrolled factor (e.g., a covariate in a candidate set).

If yes, in an operation 1803, the computing system considers exchange of a current row of uncontrolled values with other possibilities from a candidate set. The candidate set comprises sets of specified options for the one or more uncontrolled factors. In an operation 1805, the computing system considers if there is a change that improves the criterion. For instance, the computing system generates a design of the experiment by substituting a respective indexed set of the specified options of the respective candidate design case. The computing system can substitute by performing a row-exchange algorithm to exchange. For instance, the computing system can substitute the respective set of the specified options with the different set of the specified options from the candidate set. Alternatively, or additionally, the computing system may substitute out an entire design case of the initial subset with a different design case of the multiple candidate design cases (e.g., may substitute out assigned options assigned to the controlled variable). This may be useful if the computing system has not yet considered in a row the impact of assigned values of controlled factors on the design.

If instead the computing system in operation 1802 had determined that factor i is a controlled factor, in an operation 1804 the computing system considers changing a present value of a controlled factor. For instance, the computing system can change an assigned option for factor i by performing a coordinate-exchange algorithm to exchange assigned options according to a pre-defined set of assignable options. In an operation 1805, the computing system considers if there was a change that improves the criterion.

After performing the operation 1805 for either the change for the controlled or uncontrolled factor, if there was a change that improved the criterion for the design, the computing system in an operation 1806 makes the exchange and updates the design case. The computing system may consider one or more multiple design objectives for the design criterion. The computing system may determine a criterion measure in operation 1806 that comprises determining respective criterion measures for each of the multiple design objectives. The computing system may substitute a set of specified options or change an assigned option only if it improves all of the multiple design objectives. Alternatively, the computing system may determine priorities for the design objectives (e.g., user-defined priorities) and substitute a set of specified options or change an assigned option if it improves a measure of a prioritized design objective even if it makes some of the other objectives worse, or worse within a tolerance.

If there is no improvement (depending on the one or more design objectives), the computing system can increment i so that a next indexed data element can be considered. The computing system can optionally return to operation 1801 for the next indexed factor. Further, the computing system can repeat the flow diagram 1800 so that an indexed value is considered more than one. Alternatively, or additionally, the flow diagram 1800 can be repeated multiple times for different initial sets. Alternatively, or additionally, the computing system may have reached the end of index factors or some processing constraint and may end the process according to the flow diagram 1800.

The computing system can optionally output an indication of the design of the experiment by measuring, according to the design criterion, a respective criterion measure for each of multiple candidate designs generated from different initial designs, and selecting the candidate design from the multiple candidate designs based on the respective criterion measures (e.g., a candidate design that has the best measurement according to the design criterion). Alternatively, or additionally, a computing system may determine that multiple different substitutions or change options equally or within a tolerance improve the design. In this case, the computing system can in operation 1806 make different exchanges with candidate designs generated from one or more of different substitutions of the specified options or different changes of an assigned option. The computing system can replicate the flow diagram 1800 for each of these different candidate designs and can then select at a later point which change ultimately is producing a better resulting design.

Figure 19A:
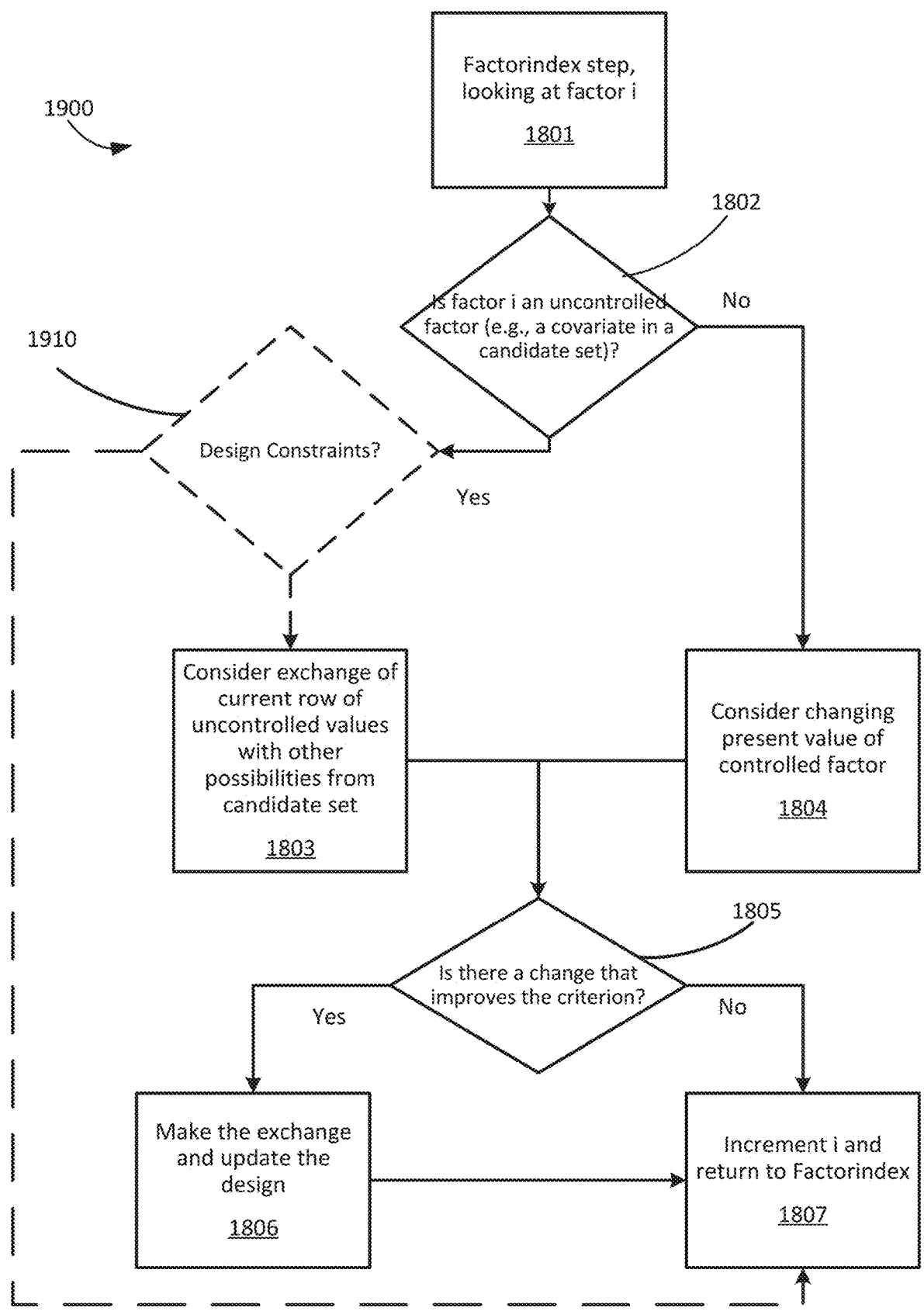
FIGS. 19A-19C illustrates example flow diagrams for modifying an indexed initial subset with optional design constraints in at least one embodiment of the present technology.
Figure 19B:
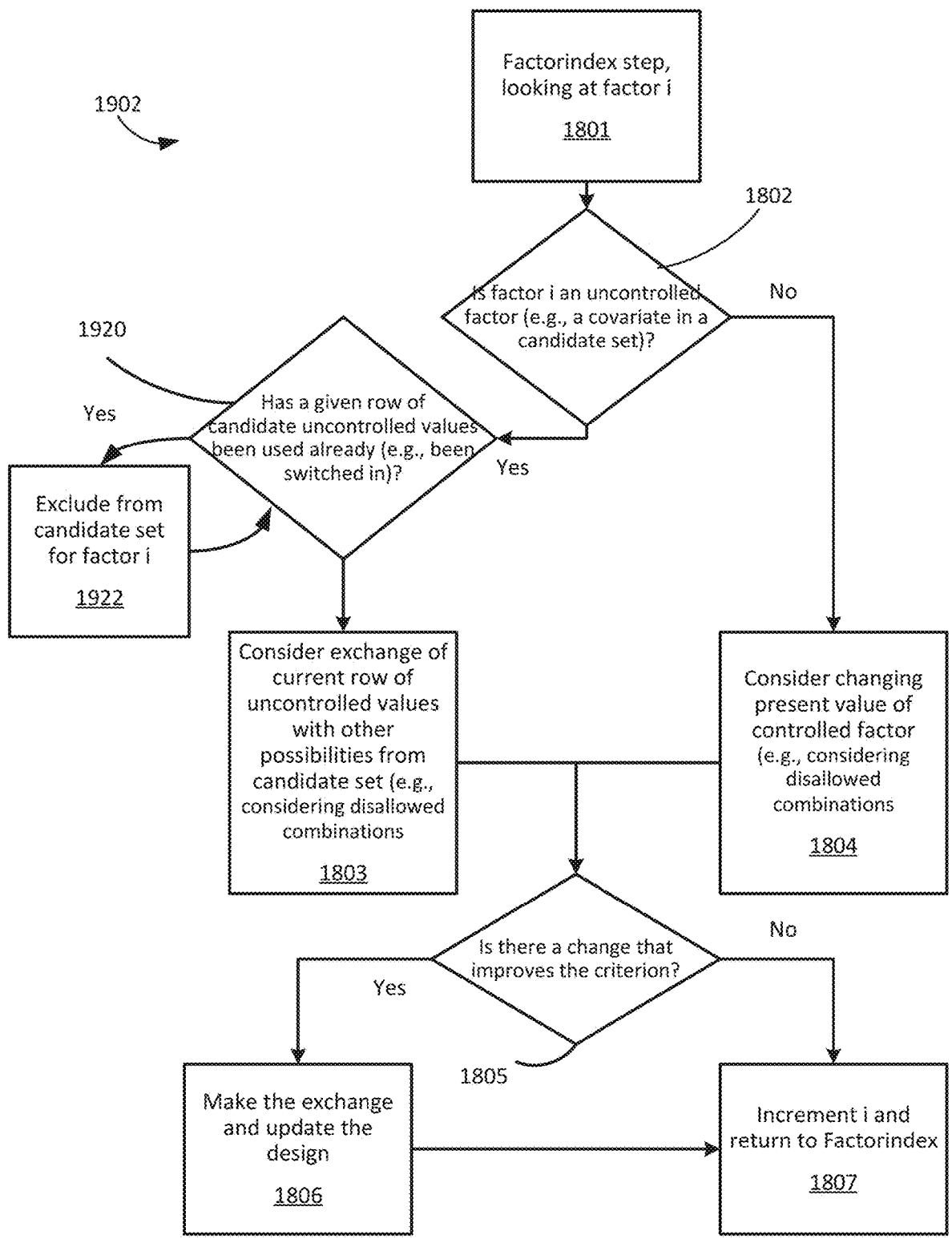
Figure 19C:
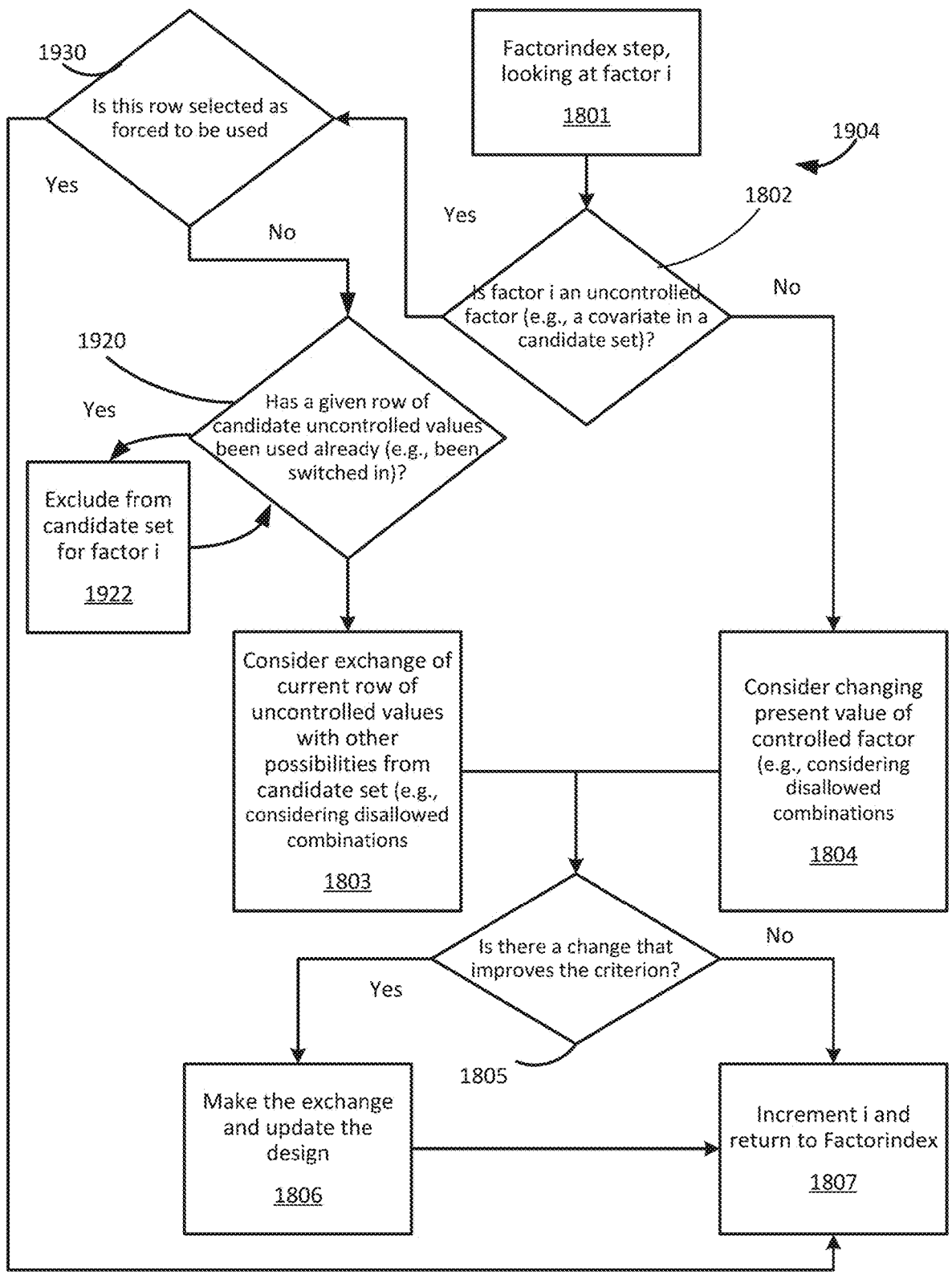

In one or embodiments, the flow diagram 1800 is constrained by further design constraints. FIGS. 19A-19C illustrates example flow diagrams that are a variant on flow diagram 1800 for modifying an indexed initial subset with optional design constraints. For instance, as shown in the flow diagram 1900 in FIG. 19A, after the operation 1802 indicates that an indexed factor is an uncontrolled factor, a computing system can optionally consider additional design constraints on the uncontrolled factors of a design in an operation 1910 before considering exchange of a current row of uncontrolled values with other possibilities in the operation 1803. This consideration could cause a computing system to continue with the operations of flow diagram 1800 as shown in flow diagram 1900 or instead move on to the next indexed factor by moving to operation 1807. This consideration can occur in other parts of the flow diagram 1900 (e.g., after, or simultaneously with the operation 1803 or operation 1805).

FIG. 19B shows an example design constraint consideration in a flow diagram 1902 which is a variation of flow diagram 1800 of FIG. 18. In this example, a computing system may access design information indicating a design of an experiment cannot have a repeating design case (e.g., in response to the user not checking checkbox 1626 in a graphical user interface 1620 of FIG. 16B). After operation 1802, the computing system in an operation 1920 may custom design the possibilities for substitution for the indexed factor by considering if a given row of candidate uncontrolled values has been used when covariate rows cannot be repeated. If a row has not been used in the design (e.g., been switched into the subset), then it can be excluded from the candidate set for the factor i in an operation 1922. Once all the rows have been considered and the candidate set fine-tuned, the computing system in operation 1803 can consider exchange of a current row of uncontrolled values with possibilities from candidate set for factor i. Accordingly, in this example, the computing system will substitute a respective set of the specified options of a respective candidate design case with a different set of the specified options of the multiple candidate design cases only if it would not have the repeating design case. The computing system can also consider other constraints in considering the substitution such as disallowed combinations. Disallowed combinations may further exclude options from the candidate design cases. After operation 1803, the computing system can carry on with the operations described with respect to flow diagram 1800 of FIG. 18.

Further, the same flow diagram 1902 can be used when the user checks checkbox 1626 in the graphical user interface 1620 of FIG. 16B to allow repeated rows. For instance, the computing system operating according to the flow diagram 1902 can force the operation 1920 to always conclude that a given row has not been switched in so that no options are excluded from the candidate set.

FIG. 19C shows a flow diagram 1904 with additional design constraints on the flow diagram 1902 of FIG. 19B related to forced rows. For instance, the computing system could receive design information indicating forced data elements that must be present in a single design case of the design of the experiment. For instance, the experiment may be a continuation of a previous experiment where a particular design case was known to have promising results or problematic results that warrant further consideration in a design. The forced data elements could include specified options of the particular design case of the multiple candidate design cases. For instance, in a baking experiment it may be known that some particular combination of ingredients must be tested (e.g., the original combination), so that can be forced in the design. Alternatively, or additionally, the forced data elements may require a particular assignment of options to a design cases (e.g., by specifying respective data elements of a particular design case). For instance, a runner is allergic to materials in shoe type A, so can only try out shoe type B. These forced data elements may be initially assigned in the subset, and the flow diagram 1904 can be used to ensure these design elements are not switched out of the subset.

In this example, the computing system considers in an operation 1930, pending the operation 1802, whether a row is selected to be forced to be used. If it is forced to be used, the computing system can refrain from substituting it by proceeding to operation 1807 to move to the next indexed factor. However, if it is not forced to be used then the computing system can proceed with operations to potentially change elements of it like operations 1920 and 1922 described with respect to FIG. 19B and/or operation 1803 described in FIG. 18. In this example, the computing system generates the design of the experiment including the forced data elements by substituting the respective set of the specified options of the respective candidate design case with the different set of the specified options of the multiple candidate design cases only if the forced data elements are present in the single design case of the design of the experiment.

In FIGS. 19B and 19C constraints are shown with respect to uncontrolled factors merely for example. Constraints could apply to controlled factors as well. For instance, a computing system could receive design information indicating one or more disallowed combinations applicable to controlled and/or uncontrolled factors. Accordingly, disallowed combinations could be considered in operation 1803 and/or operation 1804 in flow diagrams in FIGS. 19A-19C. For instance, in operation 1803 the computing system could consider exchanging a respective set of the specified options of the respective candidate design case with a different set of the specified options of the multiple candidate design cases by selecting the different set of the specified options from sets of specified options that conform to the one or more disallowed combinations. In operation 1805, the computing system could substitute if it improves the criterion measure according to the design criterion and conforms to the one or more disallowed combinations.

As another example, in operation 1804 the computing system could consider changing the assigned option of the respective design element to one of different candidate assignable options for the controlled factor by constraining the different candidate assignable options to candidate assignable options that conform to the one or more disallowed combinations.

Additionally, one or more flow diagrams can be modified to have other modifications (e.g., based on a particular implementation). For instance, in one or more embodiments, the experiment comprises multiple uncontrolled factors. In some embodiments, only one of the uncontrolled factors need be indexed. Alternatively, or additionally, more than one of the uncontrolled factors is indexed, but the computing system checks if a factor is the first covariate considered in a design case.

Figure 20:
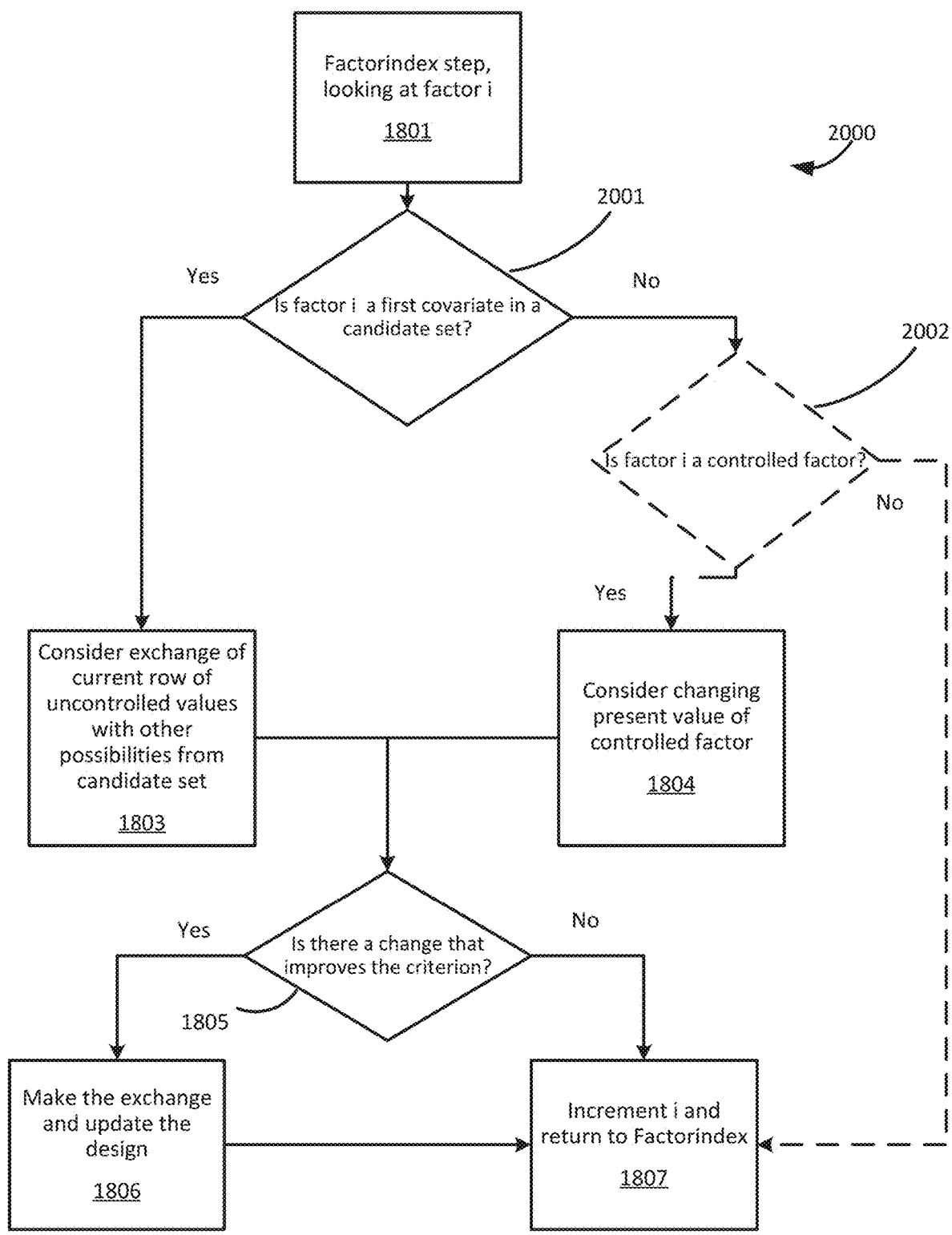
FIG. 20 illustrates an example flow diagram for modifying an indexed initial subset in at least one embodiment of the present technology.

FIG. 20 illustrates an example flow diagram 2000 for modifying an indexed initial subset that is a modification of the flow diagram 1800 in FIG. 18. Like flow diagram 1800, operation 1801 begins by a computing system considering a factor i of Factorindex. In this example, operation 2001 comprises determining if the indexed factor is a first covariate in a design case of the subset. If it is, then operations proceed as with respect to flow diagram 1800 in FIG. 18 for uncontrolled factors. If it is not, the computing system in an operation 2002 may optionally consider if the factor is a controlled factor. For instance, if it is possible to index multiple uncontrolled factors, then operation 2002 may conclude that the factor is not a controlled factor and therefore it is a subsequent uncontrolled factor. In this case the computing system, may move to an operation 1807 to increment the Factorindex so as not to waste processing efforts considering substituting a set of specified options that is already been considered for a first covariate. If in operation 2002 the computing system determines that the factor is a controlled factor, the operations can proceed as in flow diagram 1800 with an operation 1804 in which it is considered whether to change the present value of the controlled factor.

In this example, by determining whether the factor is a first one of the multiple uncontrolled factors, the computing system can generate the design of the experiment by refraining from including, in the multiple data elements, data elements corresponding to the multiple uncontrolled factors other than a first one of the multiple uncontrolled factors.

One or more embodiments herein present improvements when practitioners that rely on designed experiments use software to generate designs that are flexible enough to meet their experimental requirements where there are both controlled and uncontrolled factors in a design.

For instance, embodiments herein provide improvements over a candidate set approach. With a candidate set approach if there were controlled factors in a design, a practitioner may have to expand the candidate set by repeating each row with different possible combinations of the controllable factors. However, the size of the new candidate set quickly becomes large, and algorithms need to be modified if a row from the original candidate set is only to be used once. Embodiments herein need not repeat each row to consider different assignable options in a design case and can handle specific row requirements.

Embodiments herein also improve over coordinate-exchange approaches that could not handle both controlled and uncontrolled factors.

What is claimed is:

1. A computer-program product tangibly embodied in a non-transitory machine-readable storage medium, the computer-program product including instructions operable to cause a computing system to:
   access design information for a design of an experiment, wherein the design of the experiment comprises a selectable subset of multiple candidate design cases for a set of multiple factors, and wherein the design information comprises:
      one or more uncontrolled factors of the set of multiple factors, wherein the one or more uncontrolled factors have in each of the multiple candidate design cases specified options that are uncontrolled in generating the design of the experiment; and
      one or more controlled factors of the set of multiple factors that each have assignable options that are controlled in generating the design of the experiment;
   generate an initial subset of design cases of the multiple candidate design cases;
   determine a criterion measure for the initial subset according to a design criterion for the design of the experiment;
   index, in the initial subset, multiple data elements corresponding to at least one of the one or more uncontrolled factors and at least one of the one or more controlled factors;
   generate the design of the experiment by, for each respective data element of the multiple data elements of the initial subset:
      determining a status indicating whether the respective data element corresponds to an uncontrolled factor or a controlled factor of the set of multiple factors; and
      when the status indicates:
         the uncontrolled factor of the set of multiple factors, determining if substituting a respective set of specified options of a respective candidate design case comprising the respective data element with a different set of specified options of the multiple candidate design cases improves the criterion measure according to the design criterion; and
         the controlled factor of the set of multiple factors, determining if changing an assigned option of the respective data element improves the criterion measure according to the design criterion; and
   update the criterion measure with an updated criterion measure according to a change of the initial subset based on generating the design of the experiment.

2. The computer-program product of claim 1, wherein the instructions are operable to cause the computing system to:
   substitute the respective set of the specified options of the respective candidate design case with a different set of the specified options of the multiple candidate design cases only if it improves the criterion measure according to the design criterion; and
   change the assigned option of the respective data element to a different candidate assignable option for the given controlled factor only if it improves the criterion measure according to the design criterion.

3. The computer-program product of claim 1, wherein the instructions are operable to cause the computing system to:
   receive an indication of a probability of changing the initial set when a change would not improve the criterion measure according to the design criterion; and
   when a change of an option of a data element of the initial subset would not improve the criterion measure according to the design criterion, changing, based on the probability:
      the respective set of the specified options of the respective candidate design case with the different set of the specified options of the multiple candidate design cases; or
      the assigned option of the respective data element to a different candidate assignable option for the controlled factor.

4. The computer-program product of claim 1, wherein the instructions are operable to cause the computing system to:
   receive a request for the design of the experiment by receiving an indication of a user-defined amount of the selectable subset of the multiple candidate design cases; and
   output an indication of the design of the experiment by outputting to a graphical user interface the design of the experiment with the user-defined amount of the selectable subset of the multiple candidate design cases.

5. The computer-program product of claim 1, wherein the instructions are operable to cause the computing system to:
   receive a request for a design of the experiment indicating an amount of the selectable subset of the multiple design cases for the design of the experiment; and generate the initial subset by randomly selecting design cases of the multiple candidate design cases according to the amount of design cases.

6. The computer-program product of claim 1, wherein the instructions are operable to cause the computing system to:
receive a request for a design of the experiment indicating constraints on the assignable options for the design of the experiment; and
generate the initial subset by randomly assigning the assignable options to the initial subset of design cases according to the constraints on the assignable options.

7. The computer-program product of claim 1, wherein instructions are operable to cause the computing system to generate the design of the experiment by:
generating an intermediate design according to the status indicating whether the respective data element corresponds to the uncontrolled factor or the controlled factor of the set of multiple factors for each of the indexed multiple data elements of the initial subset;
indexing subsequent data elements of the intermediate design or a further design based on the intermediate design; and
generating a subsequent design by determining whether a subsequent data element corresponds to an uncontrolled factor or a controlled factor of the set of multiple factors for each of the indexed subsequent data elements of the intermediate design or the further design based on the intermediate design.

8. The computer-program product of claim 1,
wherein the one or more controlled factors comprise a categorical factor with a pre-defined set of assignable options; and
wherein the instructions are operable to cause the computing system to generate the design of the experiment by:
assigning, from the pre-defined set of assignable options, to design elements corresponding to the categorical factor in the initial subset of design cases; and
changing the assigned option of the respective data element by performing a coordinate-exchange algorithm to exchange assigned options according to the pre-defined set of assignable options.

9. The computer-program product of claim 1, wherein the instructions are operable to cause the computing system to generate the design of the experiment by substituting the respective set of the specified options of the respective candidate design case, wherein the substituting comprises performing a row-exchange algorithm to exchange:
the respective set of the specified options with the different set of the specified options; or
a design case of the initial subset with a different design case of the multiple candidate design cases.

10. The computer-program product of claim 1, wherein the instructions are operable to cause the computing system to further determine an amount of the multiple data elements based on one or more of:
a processing constraint;
a number of times for determining that changing an assigned option in the initial subset failed to improve the criterion measure according to the design criterion; and
a number of times for determining that substituting a set of specified options in the initial subset failed to improve the criterion measure according to the design criteria.

11. The computer-program product of claim 1,
wherein the design information comprises an indication indicating the design of the experiment can not have a repeating design case; and
wherein the instructions are operable to cause the computing system to substitute the respective set of the specified options of a respective candidate design case with the different set of the specified options of the multiple candidate design cases only if it would not have the repeating design case.

12. The computer-program product of claim 1,
wherein the design information further comprises an indication indicating forced data elements that must be present in a single design case of the design of the experiment, wherein the forced data elements comprise respective data elements of a particular design case or respective specified options of the particular design case of the multiple candidate design cases; and
wherein the instructions are operable to cause the computing system to generate the design of the experiment including the forced data elements by substituting the respective set of the specified options of the respective candidate design case with the different set of the specified options of the multiple candidate design cases only if the forced data elements are present in the single design case of the design of the experiment.

13. The computer-program product of claim 1, wherein the instructions are operable to cause the computing system to:
access the design information further comprising one or more disallowed combinations, wherein a given disallowed combination constrains the design of the experiment from having a first specified option or a first assigned option for a first factor of the set of multiple factors when a second specified option or a second assigned option for a second factor of the set of multiple factors is in the initial subset; and
wherein the determining if:
substituting the respective set of the specified options of the respective candidate design case with the different set of the specified options of the multiple candidate design cases improves the criterion measure according to the design criterion comprises selecting the different set of the specified options from sets of specified options that conform to the one or more disallowed combinations; or
changing the assigned option of the respective design element to one of different candidate assignable options for the uncontrolled factor comprises constraining the different candidate assignable options to candidate assignable options that conform to the one or more disallowed combinations.

14. The computer-program product of claim 1,
wherein the design information comprises multiple uncontrolled factors; and
wherein the generating the initial subset of the design cases comprises assigning the assignable options to the initial subset of the design cases balanced with respect to a first uncontrolled factor of the multiple uncontrolled factors without regard to unbalance with respect to other uncontrolled factors of the multiple uncontrolled factors.

15. The computer-program product of claim 1,
wherein the one or more uncontrolled factors comprise multiple uncontrolled factors;
wherein the determining the status comprises determining whether the factor is a first one of the multiple uncontrolled factors; and wherein the instructions are operable to cause the computing system to generate the design of the experiment by refraining from including, in the multiple data elements, data elements corresponding to the multiple uncontrolled factors other than the first one of the multiple uncontrolled factors.

16. The computer-program product of claim 1,
wherein the instructions are operable to cause the computing system to output an indication of the design of the experiment by:
measuring, according to the design criterion, a respective criterion measure for each of multiple candidate designs; and
selecting the candidate design from the multiple candidate designs based on the respective criterion measures; and
wherein the candidate designs are generated from one or more of:
different initial designs;
different substitutions of the specified options; and
different changes of the assigned option.

17. The computer-program product of claim 1,
wherein the design criterion for the design of the experiment is a first design criterion of multiple design criterion options; and
wherein the initial subset is selected according to a second design criterion of the multiple design criterion options that is different than the first design criterion;
wherein the instructions are operable to cause the computing system to:
display a graphical user interface for user control of the design of the experiment; and
receive via the graphical user interface a user selection of:
the one or more uncontrolled factors;
the one or more controlled factors; and
the first design criterion of the multiple design criterion options.

18. The computer-program product of claim 1,
wherein the design criterion for the design of the experiment comprises multiple design objectives;
wherein the instructions are operable to cause the computing system to:
determine the criterion measure for the initial subset according to the design criterion by determining respective criterion measures for each of the multiple design objectives;
substitute the respective set of the specified options of the respective candidate design case with the different set of the specified options of the multiple candidate design cases only if it improves a measure of a prioritized design objective of the multiple design objectives or all of the multiple design objectives; and
change the assigned option of the respective data element only if it improves a measure of a prioritized design objective of the multiple design objectives or all of the multiple design objectives.

19. The computer-program product of claim 1, wherein the design criterion for the design of the experiment is a first design criterion of multiple possible design criterions comprising one or more of D-optimality, I-optimality, A-optimality, G-optimality, and Alias-Optimality.

20. The computer-program product of claim 1, wherein the instructions are operable to cause the computing system to access the design information further comprising a selection of a subset of multiple uncontrolled factors of a dataset comprising observed results for the multiple uncontrolled factors.

21. The computer-program product of claim 1,
wherein the one or more controlled factors comprise a continuous factor with a pre-defined range; and
wherein the assignable options comprise all options within the pre-defined range or are a representative subset of the possible options.

22. The computer-program product of claim 1, wherein determining if substituting the respective set of the specified options of the respective candidate design case with the different set of the specified options of the multiple candidate design cases improves the criterion measure according to the design criterion comprises testing for improvement of the criterion measure for each unique combination of specified options of the multiple candidate design cases.

23. A computer-implemented method comprising:
accessing design information for a design of an experiment, wherein the design of the experiment comprises a selectable subset of multiple candidate design cases for a set of multiple factors, and wherein the design information comprises:
one or more uncontrolled factors of the set of multiple factors, wherein the one or more uncontrolled factors have in each of the multiple candidate design cases specified options that are uncontrolled in generating the design of the experiment; and
one or more controlled factors of the set of multiple factors that each have assignable options that are controlled in generating the design of the experiment;
generating an initial subset of design cases of the multiple candidate design cases;
determining a criterion measure for the initial subset according to a design criterion for the design of the experiment;
indexing, in the initial subset, multiple data elements corresponding to at least one of the one or more uncontrolled factors and at least one of the one or more controlled factors;
generating the design of the experiment by, for each respective data element of the multiple data elements of the initial subset:
determining a status indicating whether the respective data element corresponds to an uncontrolled factor or a controlled factor of the set of multiple factors; and
when the status indicates:
the uncontrolled factor of the set of multiple factors, determining if substituting a respective set of specified options of a respective candidate design case comprising the respective data element with a different set of specified options of the multiple candidate design cases improves the criterion measure according to the design criterion; and
the controlled factor of the set of multiple factors, determining if changing an assigned option of the respective data element improves the criterion measure according to the design criterion; and
updating the criterion measure with an updated criterion measure according to a change of the initial subset based on generating the design of the experiment.

24. The computer-implemented method of claim 23, wherein the method further comprises:
substituting the respective set of the specified options of the respective candidate design case with a different set of the specified options of the multiple candidate design cases only if it improves the criterion measure according to the design criterion; and
changing the assigned option of the respective data element to a different candidate assignable option for the given controlled factor only if it improves the criterion measure according to the design criterion.

25. The computer-implemented method of claim 23, wherein the method further comprises:
receiving a request for a design of the experiment indicating a user-defined amount of the selectable subset of the multiple design cases for the design of the experiment; and
outputting to a graphical user interface the design of the experiment with the user-defined amount of the selectable subset of the multiple candidate design cases; and
wherein the generating the initial subset comprises randomly selecting design cases of the multiple candidate design cases according to the user-defined amount of the selectable subset of the multiple design cases.

26. The computer-implemented method of claim 23, wherein the method further comprises receiving a request for a design of the experiment indicating constraints on the assignable options for the design of the experiment; and
wherein the generating the initial subset comprises randomly assigning the assignable options to the initial subset of design cases according to the constraints on the assignable options.

27. The computer-implemented method of claim 23, wherein the one or more controlled factors comprise a categorical factor with a pre-defined set of assignable options; and
wherein the generating the design of the experiment comprises:
assigning, from the pre-defined set of assignable options, to design elements corresponding to the categorical factor in the initial subset of design cases; and
changing the assigned option of the respective data element by performing a coordinate-exchange algorithm to exchange assigned options according to the pre-defined set of assignable options.

28. The computer-implemented method of claim 23, wherein the generating the design of the experiment comprises substituting the respective set of the specified options of the respective candidate design case, wherein the substituting comprises performing a row-exchange algorithm to exchange:
the respective set of the specified options with the different set of the specified options; or
a design case of the initial subset with a different design case of the multiple candidate design cases.

29. The computer-implemented method of claim 23, wherein the design information further comprises an indication indicating forced data elements that must be present in a single design case of the design of the experiment, wherein the forced data elements comprise respective data elements of a particular design case or respective specified options of the particular design case of the multiple candidate design cases; and
wherein the generating the design of the experiment comprises including the forced data elements by substituting the respective set of the specified options of the respective candidate design case with the different set of the specified options of the multiple candidate design cases only if the forced data elements are present in the single design case of the design of the experiment.

30. A computing device comprising processor and memory, the memory containing instructions executable by the processor wherein the computing device is configured to:
access design information for a design of an experiment, wherein the design of the experiment comprises a selectable subset of multiple candidate design cases for a set of multiple factors, and wherein the design information comprises:
one or more uncontrolled factors of the set of multiple factors, wherein the one or more uncontrolled factors have in each of the multiple candidate design cases specified options that are uncontrolled in generating the design of the experiment; and
one or more controlled factors of the set of multiple factors that each have assignable options that are controlled in generating the design of the experiment;
generate an initial subset of design cases of the multiple candidate design cases;
determine a criterion measure for the initial subset according to a design criterion for the design of the experiment;
index, in the initial subset, multiple data elements corresponding to at least one of the one or more uncontrolled factors and at least one of the one or more controlled factors;
generate the design of the experiment by, for each respective data element of the multiple data elements of the initial subset:
determining a status indicating whether the respective data element corresponds to an uncontrolled factor or a controlled factor of the set of multiple factors; and
when the status indicates:
the uncontrolled factor of the set of multiple factors, determining if substituting a respective set of specified options of a respective candidate design case comprising the respective data element with a different set of specified options of the multiple candidate design cases improves the criterion measure according to the design criterion; and
the controlled factor of the set of multiple factors, determining if changing an assigned option of the respective data element improves the criterion measure according to the design criterion; and
update the criterion measure with an updated criterion measure according to a change of the initial subset based on generating the design of the experiment.

* * * * *